(12) United States Patent
Pfeuffer et al.

(10) Patent No.: US 8,057,099 B2
(45) Date of Patent: Nov. 15, 2011

(54) LINEAR ROLLER BEARING WITH DEFLECTION PIECE

(75) Inventors: Carsten Pfeuffer, Roethlein (DE);
Andreas Schupies, Gochsheim (DE);
Stefan Dorn, Arnstein (DE)

(73) Assignee: Robert Bosch GmbH, Stuttgart (DE)

( * ) Notice: Subject to any disclaimer, the term of this patent is extended or adjusted under 35 U.S.C. 154(b) by 557 days.

(21) Appl. No.: 12/256,835

(22) Filed: Oct. 23, 2008

(65) Prior Publication Data

US 2009/0136164 A1    May 28, 2009

(30) Foreign Application Priority Data

Nov. 26, 2007 (DE) .......................... 10 2007 056 862

(51) Int. Cl.
*F16C 29/06* (2006.01)
(52) U.S. Cl. .......................................................... 384/44
(58) Field of Classification Search ................ 384/43–45
See application file for complete search history.

(56) References Cited

U.S. PATENT DOCUMENTS

| 4,743,124 | A | 5/1988 | Blaurock |
| 6,626,572 | B2 | 9/2003 | Teramachi |
| 2002/0136472 | A1 | 9/2002 | Mochizuki et al. |
| 2006/0262999 | A1 | 11/2006 | Kurachi et al. |

FOREIGN PATENT DOCUMENTS

| DE | 24 55 291 | 5/1976 |
| DE | 36 20 571 | 12/1987 |
| DE | 20 2005 013 142 | 1/2006 |
| DE | 20 2006 007 930 | 12/2006 |

*Primary Examiner* — Thomas R Hannon
(74) *Attorney, Agent, or Firm* — Michael J. Striker

(57) ABSTRACT

A guide carriage for a linear roller bearing includes a main body, which may bear in a longitudinally movably manner and via at least a first and at least a second endlessly circulating roller row against a guide rail that extends in a longitudinal direction, a deflection assembly provided on an end face of the main body and including at least one curved inner deflection channel for the first roller row, and at least a second curved outer deflection channel for the second roller row, the inner deflection channel being located within the outer deflection channel, the deflection assembly includes an end cap, on the inner side of which—that faces the main body— an outer boundary surface of the outer deflection channel is provided, and at least one separate, one-pieced deflection piece inserted in the end cap, on which an inner boundary surface is provided that covers the entire outer deflection channel. An outer boundary surface is provided that covers the entire inner deflection channel on the deflection piece.

14 Claims, 16 Drawing Sheets

LINEAR ROLLER BEARING WITH DEFLECTION PIECE

CROSS-REFERENCE TO RELATED APPLICATION

The invention described and claimed hereinbelow is also described in German Patent Application DE 10 2007 056 862.4 filed on Nov. 26, 2007. This German Patent Application, whose subject matter is incorporated here by reference, provides the basis for a claim of priority of invention under 35 U.S.C. 119(a)-(d).

BACKGROUND OF THE INVENTION

The present invention relates to a guide carriage, and a linear roller bearing with a guide carriage of this type.

Publication DE 36 20 571 C2 shows, in FIG. 1, a linear roller bearing with a guide rail that extends in a longitudinal direction. A guide carriage composed of a main body and two end-face deflection assemblies bears against guide rail in a longitudinally movable manner via a total of four endlessly circulating roller rows. FIGS. 4 and 5 show cross-sectional views of the deflection assembly, in which a curved, outer deflection channel for a first roller row, and a curved, inner deflection channel for a second roller row located within the outer deflection channel are shown. The deflection assembly includes an end cap, on the inner side of which outer boundary surface of the outer deflection channel is formed. A separate, one-pieced deflection piece is inserted into the end cap, on which inner boundary surface of the outer deflection channel is provided.

Outer boundary surface is provided in a first section on the deflection piece, and in a second section on the end cap. This has the disadvantage that the rollers roll over the vertical joint between the deflection piece and the end cap. The end cap and the deflection piece are typically injection-molded out of plastic, and are therefore beset with the related production inaccuracies. The vertical joint is therefore uneven and not always completely closed. As a result, noises are produced when the rollers roll over the vertical joint. The noise is amplified further by the fact that the rollers are forced outwardly against the outer boundary surface of the deflection channel due to the centrifugal forces acting in the curved deflection channels.

SUMMARY OF THE INVENTION

It is therefore an object of the present invention to provide a linear roller bearing with deflection piece, which avoids the disadvantages of the prior art.

In accordance with the present in$^{vention}$, it is provided that the outer boundary surface covers the entire inner deflection channel on the deflection piece. This has the advantage that the vertical joint mentioned above is avoided, thereby reducing the amount of noise produced by the linear roller bearing.

A lifting projection may be provided on the deflection piece, in order to lift the rollers from the guide rail and transfer them to the assigned inner deflection channel. Since the lifting projection is therefore connected as a single piece with the one-pieced deflection piece, an additional vertical joint and, therefore, unnecessary noise are avoided. It should be noted here that a small gap is always provided between the lifting nose and the guide rail, to prevent the lifting projection from becoming worn due to the relative motion between the guide carriage and the guide rail.

At least one reinforcing rib may be provided on the lifting nose of the deflection piece, the reinforcing rib preferably being oriented parallel to the longitudinal direction. Due to the speeds at which the rolling elements travel—which may be extremely high at times—strong forces act on the lifting projection when the lifting projection deflects a roller from the straight track and transfers it to the curved inner deflection channel. Since the deflection elements are preferably injection-molded out of plastic, and are therefore composed of a material with low rigidity and stiffness, they must be reinforced in the shaping process. This may be attained in a particularly material-saving manner by using a reinforcing rib. At the same time, warpage is prevented via the injection molding, because the wall thickness of the deflection element is essentially constant everywhere. As a result of the preferred orientation of the reinforcing rib in the longitudinal direction, its reinforcing effect is particularly strong. In addition, the particular deflection piece does not have an undercut in the longitudinal direction, thereby enabling it to be manufactured using a second cast-molding that may be opened in a direction that corresponds to the longitudinal direction of the linear roller bearing.

At least one lifting projection may be provided on the deflection piece, in order to lift the rollers from the guide rail and transfer them to the assigned outer deflection channel. The lifting projection of the inner deflection channel and the lifting projection of the outer deflection channel are therefore designed as single pieces with the component that defines the outer boundary surface of the particular deflection channel. The amount of noise developed is therefore particularly low, because the rolling elements do not have to roll over unnecessary vertical joints.

A deflection plate may be located between the end cap and the main body, on which an inner boundary surface of the inner deflection channel and an inner boundary surface of a third deflection channel of a third endlessly circulating roller row are provided. The inner boundary surface of the inner deflection channel is typically relatively short, and the particular inner deflection component is relatively small. The accuracy of the orientation between the deflection piece and the inner deflection component is therefore low, because its dimensions are unfavorable compared with the dimensions of the unavoidable gap between the end cap, deflection piece, and the inner deflection component. The result is that the rollers produce additional noise while rolling. With the proposed means of attaining the object of the present invention, the deflection plate of the end cap is pushed against the main body without a gap, so that the inner boundary surfaces are positioned exactly, thereby preventing the rolling noises.

The dimensions of the deflection plate are much greater than those of an individual inner deflection element, which also results in an increase in the positioning accuracy. The deflection plate is preferably composed of a material that is much more elastic than the material of which the end cap and the deflection piece are made. Every single gap may be prevented entirely via the elastic deformation of the deflection plate in the manner of a static seal. At the same time, the deflection piece is pressed against the end cap via the elasticity of the deflection plate, thereby also improving the accuracy of the orientation of the deflection piece.

Two first and two second endlessly circulating roller rows may be provided, two identical deflection pieces being located in the end cap in an antiparallel manner. Due to the four roller rows, the linear roller bearing may absorb loads in all directions transverse to the longitudinal direction. The carrying rollers of adjacent roller rows are preferably oriented at 90° to each other, thereby ensuring that the roadability of the linear roller bearing is the same in every transverse direction. Due to the antiparallel configuration that is proposed, it is possible to use two identical deflection pieces. They may be manufactured in a cost-favorable manner using a single plastic injection-molding tool. Two deflection pieces are installed in an antiparallel manner when the outer boundary surfaces of the assigned inner deflection channels extend in parallel, the associated lifting projections being provided on opposite ends of the boundary surfaces described above.

At least one guide groove for spacer elements—which are located between the rollers—is provided in the deflection channels, the vertical joint between the deflection piece and the end cap or the deflection plate and the deflection piece being located within the guide groove, preferably in the base of the guide groove. Spacer elements are, e.g., flexible roller chains as described in U.S. Pat. No. 6,626,572 B2, spacer pieces as described in US 2006/0262999 A1, or rigid roller holders as described in DE 24 55 91 A1. These spacer elements hold the rollers at a distance, to prevent noises from forming due to steel rollers rubbing directly against each other. All of the spacer elements described include guide projections for engagement in guide grooves located on the guide carriage.

The proposed means of attaining the object of the invention has the advantage that the rollers are unable to come in contact with the vertical joint, thereby preventing the development of running noises. The preferred location of the vertical joint in the base of the guide groove has the advantage that the roller retaining elements are also unable to come in contact with the vertical joint, because the combination of roller retaining element and rollers is generally sized such that only the end faces of the rollers are able to touch the lateral surfaces of the roller deflection channels that are oriented transversely to the roller axis, which is not the case with the spacer elements. Since the groove base is oriented transversely to the roller axis, it is not contacted by the spacer elements, either.

At least one extension element with a U-shaped cross section is provided on the deflection piece, which extends the outer boundary surface for the inner deflection channel and/or the inner boundary surface for the outer deflection channel in the longitudinal direction. As a result, the boundary surfaces of the deflection channels—both of which are described above—are continued without vertical joints, thereby further minimizing the formation of noise. At the same time, the return tube, which must be provided with linear roller bearings, is designed with an inner cross section that is adapted to the rollers, and is designed as a single piece with the deflection piece, thereby simultaneously reducing the manufacturing expense. The U-shaped cross section is necessary so that the deflection piece may still be manufactured in a cost-favorable manner using the two-pieced cast molding, which is open in the longitudinal direction.

At least one extension element with a U-shaped cross section may be provided on the end cap or the deflection plate. This extension element supplements the extension element of the deflection piece and turns it into a return tube. It is therefore possible to cost-favorably manufacture a closed return tube with a defined passage cross section for the rollers. The extension elements are preferably designed as single pieces with the end cap or the deflection plate. Due to the U-shaped cross section of the extension element, it is possible to prevent the formation of undercuts in the longitudinal direction in this case as well, thereby making it possible to use a cost-favorable injection mold.

The extension element may be designed as a single piece with the deflection plate, which is made of a softer material than that of the extension element. The deflection plate is preferably manufactured using the two-component injection-molding process. As a result, the long, slender extension element is sufficiently stiff or rigid, even when it is combined with a particularly elastic deflection plate.

Two essentially identical deflection assemblies may be provided on both end faces of the main body, the return tubes meeting within the main body such that the rollers may be transferred from a return tube to the adjacent return tube. As a result, the adjacent return tubes extend across half the length of the main body. Due to the short length, inaccuracies resulting from warpage that occurs in the injection-molding process do not have an extreme effect. It is ensured that the related components may be easily inserted into the bore that is adapted to the return tube, in particular when several return tubes are provided on one deflection assembly, which may deviate considerably from the ideal parallel course due to the warpage.

As an alternative, essentially identical deflection assemblies may be provided on both lateral surfaces, the extension elements of the deflection pieces of the deflection assemblies being combined to form return tubes. In this case, the extension elements are preferably provided on the inner boundary surface of the inner deflection and in the outer boundary surface of the outer deflection of a deflection element, and they extend essentially along the entire length of the main body. This embodiment has the advantage that it may be installed in a particularly simple manner, since only one deflection element ever need be inserted in the associated bores in the main body.

When a four-rowed linear roller bearing is used, it is therefore only ever necessary to insert two extension elements simultaneously. In contrast, with the means of attaining the object of the invention described previously, four extension elements must be inserted simultaneously, which is very difficult due to the deviations in parallelism resulting from the production process. It should also be mentioned that the extension elements of the present deflection piece may be bent into the ideal parallel position using mild forces, thereby further simplifying assembly.

The novel features which are considered as characteristic for the present invention are set forth in particular in the appended claims. The invention itself however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
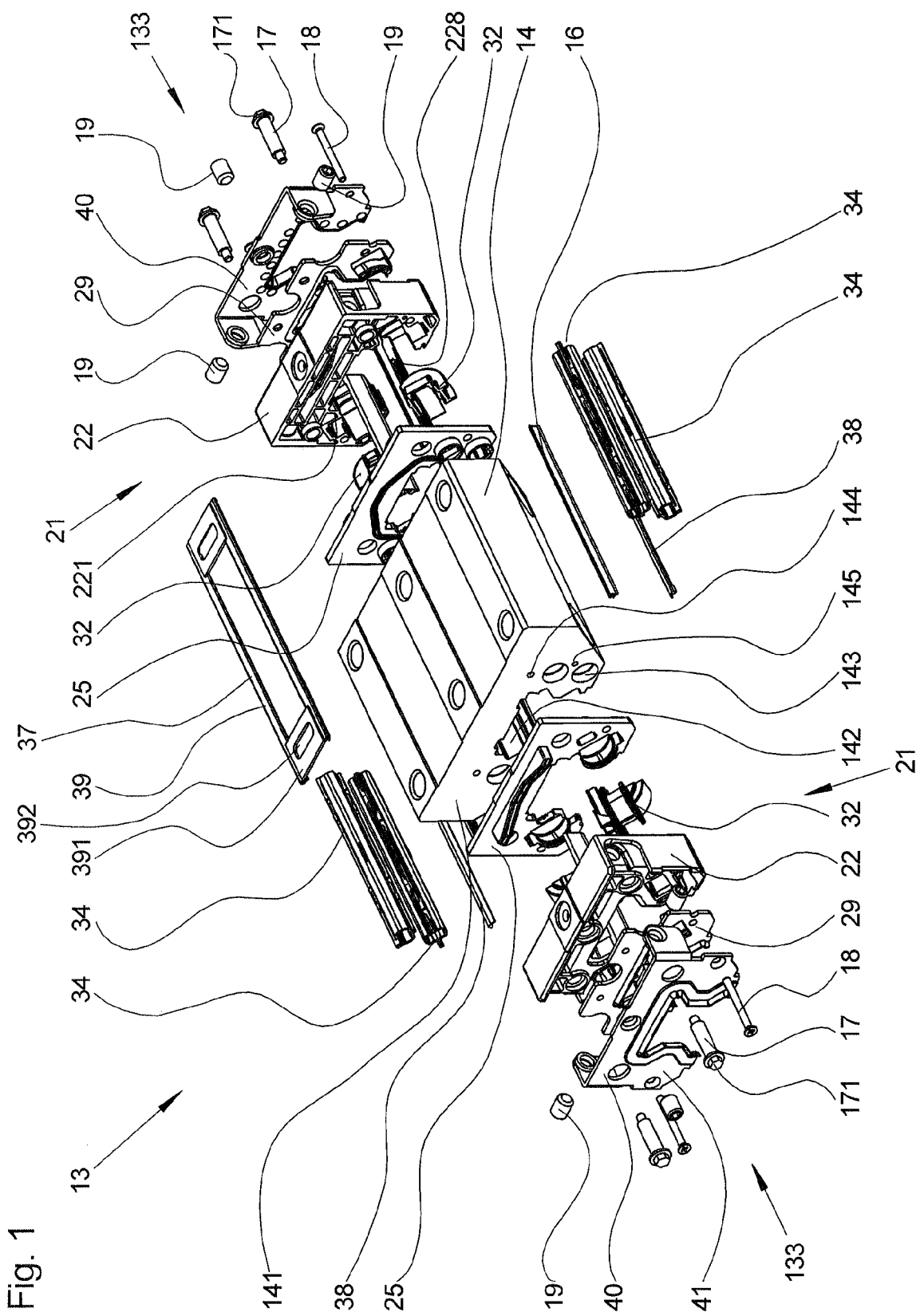
FIG. 1 shows an exploded view of a first embodiment of the inventive guide carriage, without rolling elements.

FIG. 1 shows an exploded view of a first embodiment of an inventive guide carriage 13. For clarity, the rolling elements with the spacer elements are not shown. The guide carriage includes a main body 14, which is manufactured as a single piece out of roller bearing steel. Main body 14 is hardened in the region of carriage tracks 142. As an alternative, it is also possible for main body 14 to not be made of hardened steel, in which case the carriage tracks are designed as separate track inserts made of hardened roller bearing steel.

A deflection assembly 21 is provided on both end faces 141 of main body 14 and, therefore, on end face 133 of the guide carriage, the two deflection assemblies being identical in design. Each deflection assembly 21 includes two end caps 22, on which two identical deflection pieces 32 are inserted on the inner side that faces main body 14, deflection pieces 32 being covered with a deflection plate 25. End cap 22, deflection pieces 32, and deflection plate 25 are designed such that they limit a pair of inner and outer deflection channels, which cross over each other.

Each of the two deflection assemblies 21 is completed with a closing element 29 and a stripper assembly 40. Each deflection assembly 21 is attached to main body 14 via threaded bore 144 using two first screw bolts 17, the heads 171 of which bear against end cap 22. In addition, two second screw bolts 18 are provided, which engage in thread 145 of main body 14. Second screw bolts 18 press stripper assembly 40 against end cap 22. Several threaded sections are provided on stripper assembly 40, in which threaded pins 19 are screwed, in order to close the inlet openings in lubricating channels. The threaded pins may be replaced, e.g., with grease fittings, if necessary.

In addition, four return tubes 34 are provided between the two deflection assemblies 21, which connect the inner and outer deflection channels with each other. Each of the four return tubes 34 is accommodated in a continuous return bore 143 in main body 14.

In addition, four longitudinal seals 38, 39 are clamped between the two deflection assemblies 21 such that they are stretched elastically. The two upper longitudinal seals 39 are designed as single pieces with a plate-type retaining element 391 in which an opening 392 is provided, in which a hook element on end cap engages. Finally, two identical stabilizing bars 16 with a constant cross-sectional profile are provided, which engage in rolling element guide extensions 228 on the end cap.

Figure 2:
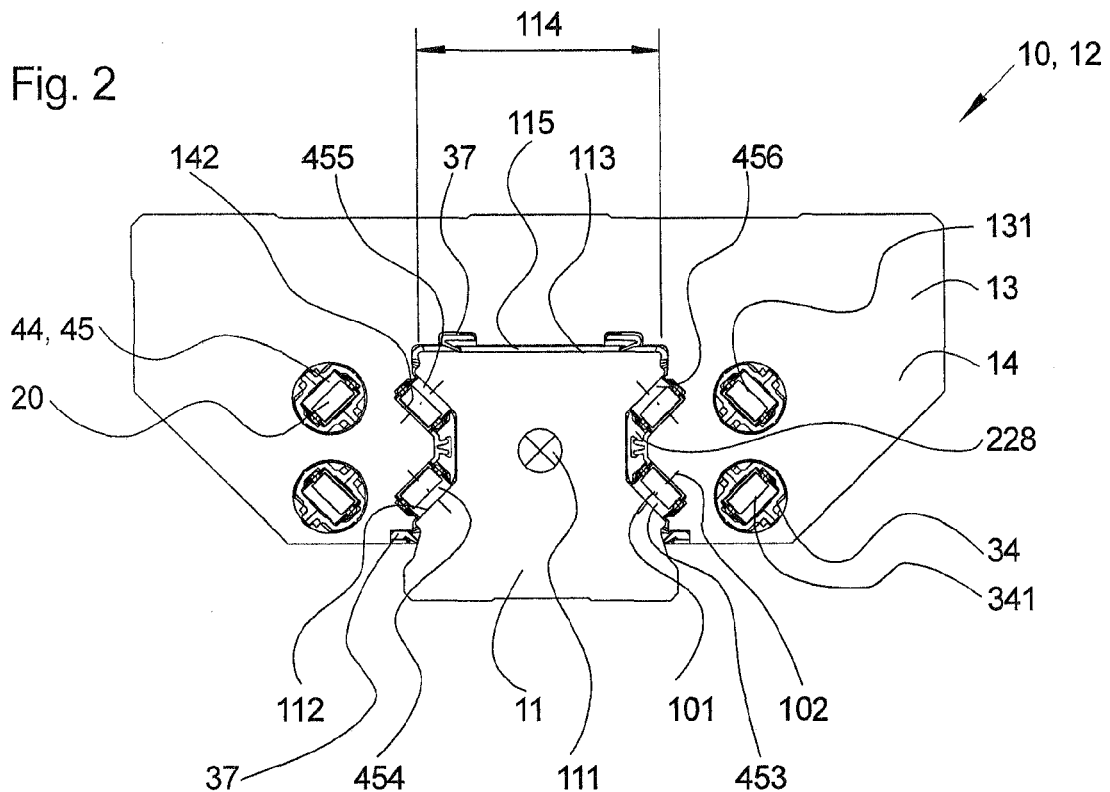
FIG. 2 shows a cross-sectional view of a linear roller bearing with the guide carriage in FIG. 1.
Figure 2A:
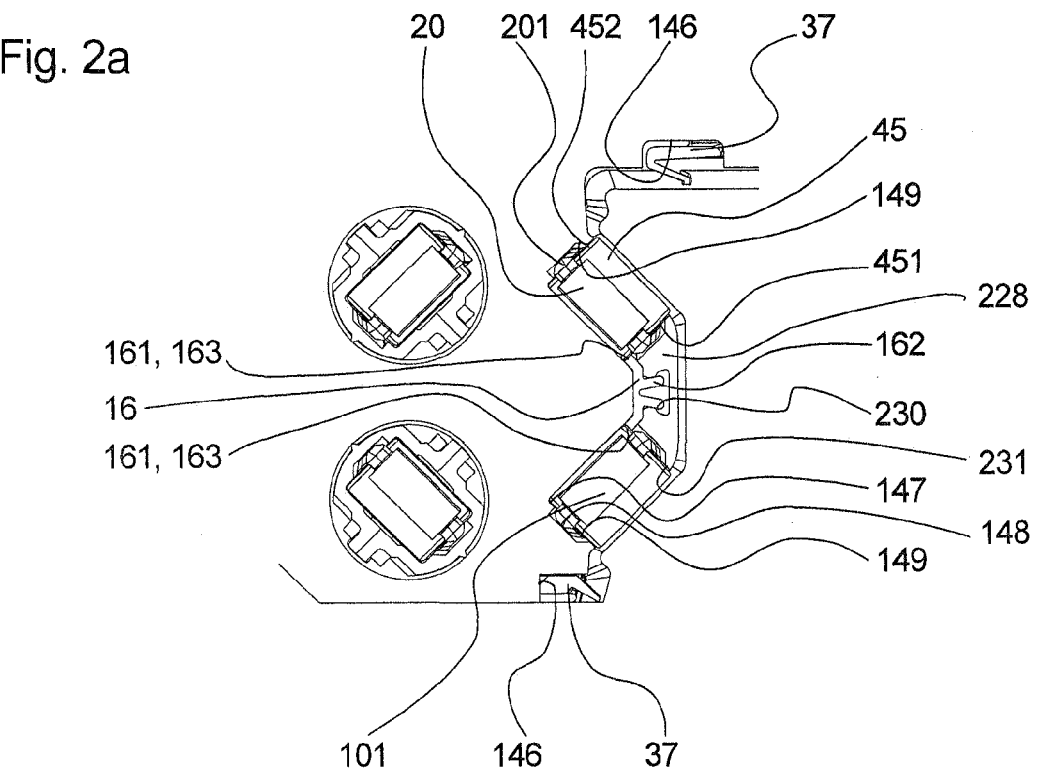
FIG. 2a shows a section of FIG. 2 in the region of the carrier channels.

FIG. 2 shows the cross section of a linear rolling-element bearing 10 in the form of a linear roller bearing 12 with upper guide carriage 13. FIG. 2a shows a section of FIG. 2 in the region of carrier channel 101. Linear roller bearing 12 includes a guide rail 11 made of roller bearing steel, which is inductively hardened in the region of four rail tracks 112. Guide rail 11 extends with a constant cross-sectional profile in a longitudinal direction 111, which is perpendicular to the plane of the drawing. A cover plate 115 is provided on head surface 113 of guide rail 11, with which fastening bores of guide rail 11 are covered, thereby providing a continuous, flat mating surface for the end-face sealing lips of the guide carriage.

Four rows 44 of endlessly circulating rolling elements roll on rail tracks 112, which simultaneously roll on the four carriage tracks 142 on main body 14, which encloses guide rail 11 in the shape of a U. Carriage track 142 and associated rail track 112 therefore form a carrier channel 101. The rolling elements are designed as cylindrical rollers 45 made of hardened roller bearing steel, thereby resulting in a first roller row 453, a second roller row 454, a third roller row 455, and a fourth roller row 456. Adjacent carriage and rail tracks 112, 142 are located at an angle of 90° relative to each other, thereby ensuring that linear roller bearing 10 may be loaded equally in all directions transversely to longitudinal direction 111. Pressure lines 102, which are defined by carriage and rail tracks 112, 142, have an O-shaped configuration. The linear roller bearing therefore has a high moment load-carrying capacity relative to longitudinal axis 111.

The four return tubes 34 with return guide channels 341 in which rollers 45 are returned are also shown. Advancing and returning rollers 45 in an endlessly circulating row of rolling elements are oriented in parallel with each other. The ends of return guide channels 341 are connected with the ends of associated carrier channels 101 via curved deflection channels in the deflection assemblies, thereby producing an endless circulatory channel 131.

FIG. 2a shows stabilizing bar 16, which engages via two separate segments 162 in an undercut groove 230 of rolling element guide extension 228 of the end cap. Segments 162 and undercut groove 230 are designed to complement each other such that stabilizing bar 16 may be snapped in place in undercut groove 230 with elastic deformation of segments 162.

Two first guide surfaces 161 are provided on stabilizing strip 16, which are engaged in a guiding manner with first end surfaces 451 of rollers 45 of two adjacent rolling element rows 44. The two opposite end surfaces 452 of the rollers are engaged in a guiding manner with second guide surfaces 147 directly on main body 14. Second guide surface 147 is interrupted by a guide groove 148, in which lateral guide extensions 201 of spacer elements 20 for rollers 45 engage. Lateral surfaces 149 of two adjacent guide grooves 148 are designed to be parallel, so that they may be manufactured together with the adjacent main body contour using a single grinding disk. Using spacer elements 20, the rollers are kept separated, thereby preventing metallic contact between the rotating rollers, which prevents noise from being produced. At the same time, the rollers are held in the guide carriage by the spacer elements, even when the guide carriage is pulled away from the guide rail. Space elements are designed as described in DE 10 2006 056 087.

A third guide surface 231 is provided on rolling element guide extension 228 of the end cap. Third guide surface 231—together with first guide surface 161 on stabilizing bar 161—forms a cross-sectional contour that is essentially symmetrical with the cross-sectional contour of second guide surface 147 with guide groove 148. Spacer elements 20 are also symmetrical. Several guide surfaces 163 are therefore provided on stabilizing bar 16, i.e., first guide surface 162 and a lateral surface of the guide groove.

The four longitudinal seals 37 that extend in the longitudinal direction and that are in sealing engagement with guide rail 11 are also shown. Longitudinal seals 37 have a relatively small cross-sectional area and are composed of a thermoplastic ether ester elastomer (TEEE, trade name "Hytrel"), which enables them to be deformed on all sides via bending. For purposes of stabilization, they are each accommodated in a separate orienting groove 146 formed directly in main body 14.

Figure 3:
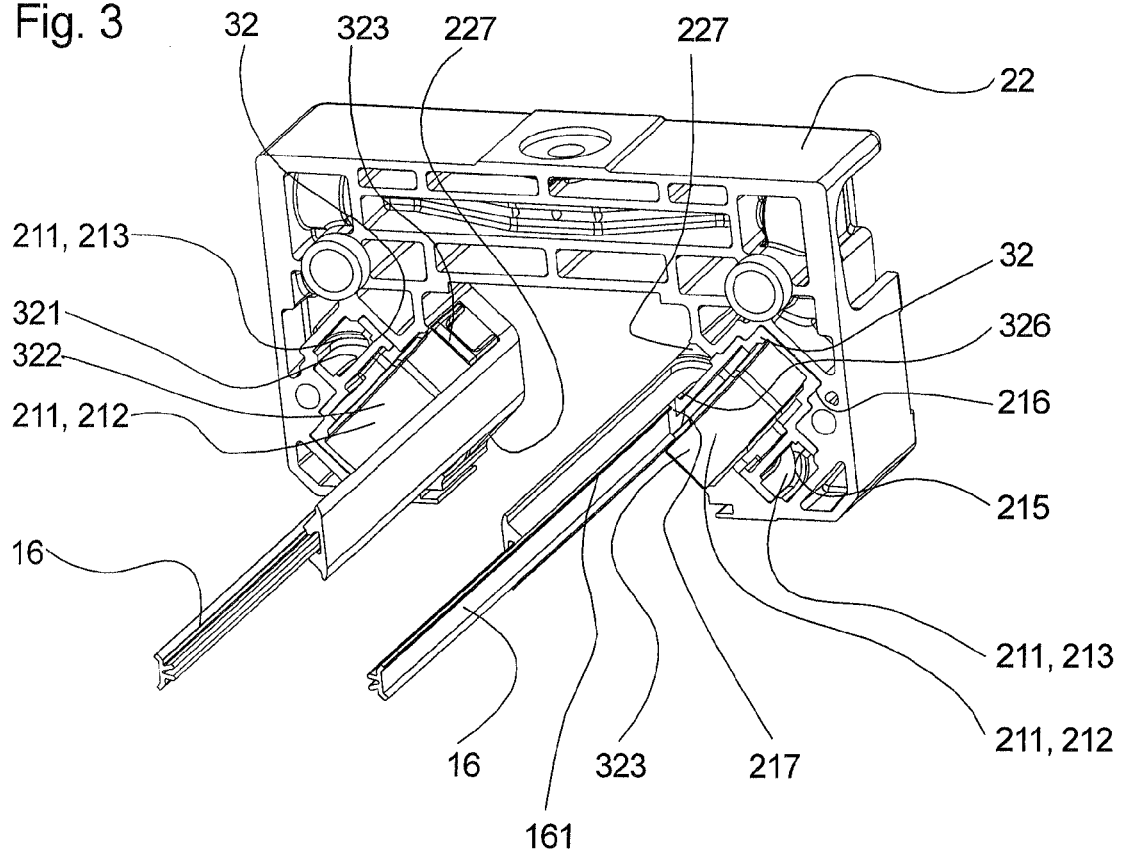
FIG. 3 shows the end cap, the deflection piece, and the stabilizing bar, in the assembled state.

FIG. 3 shows end cap 22, deflection pieces 32, and stabilizing bar 16 in the assembled state. It is shown how end cap 22—together with a deflection piece 32—limits an outer deflection channel 213. Outer deflection channel 213 leads, in a curved manner, to a lifting projection 227 on the end cap, which lifts the associated rollers off of the rail track. Outer boundary surface 322 of inner deflection channel 212 is provided on the inner side of deflection piece 32. Inner deflection channel 212 transitions as a single piece into a lifting projection 323 on the deflection piece. As a result, assigned inner deflection channel 212 is located inside outer deflection channel 213. Inner deflection channel 212 is completed by the deflection plate, which is described below.

It is also shown that the two deflection pieces are inserted in the end cap in an antiparallel manner, i.e., outer boundary surfaces 322 of inner deflection channel 212 extend in parallel, associated lifting projections 323 being provided on opposite ends of the boundary surfaces described above. In this manner, it is possible to use two identical deflection pieces in one end cap.

Figure 4:
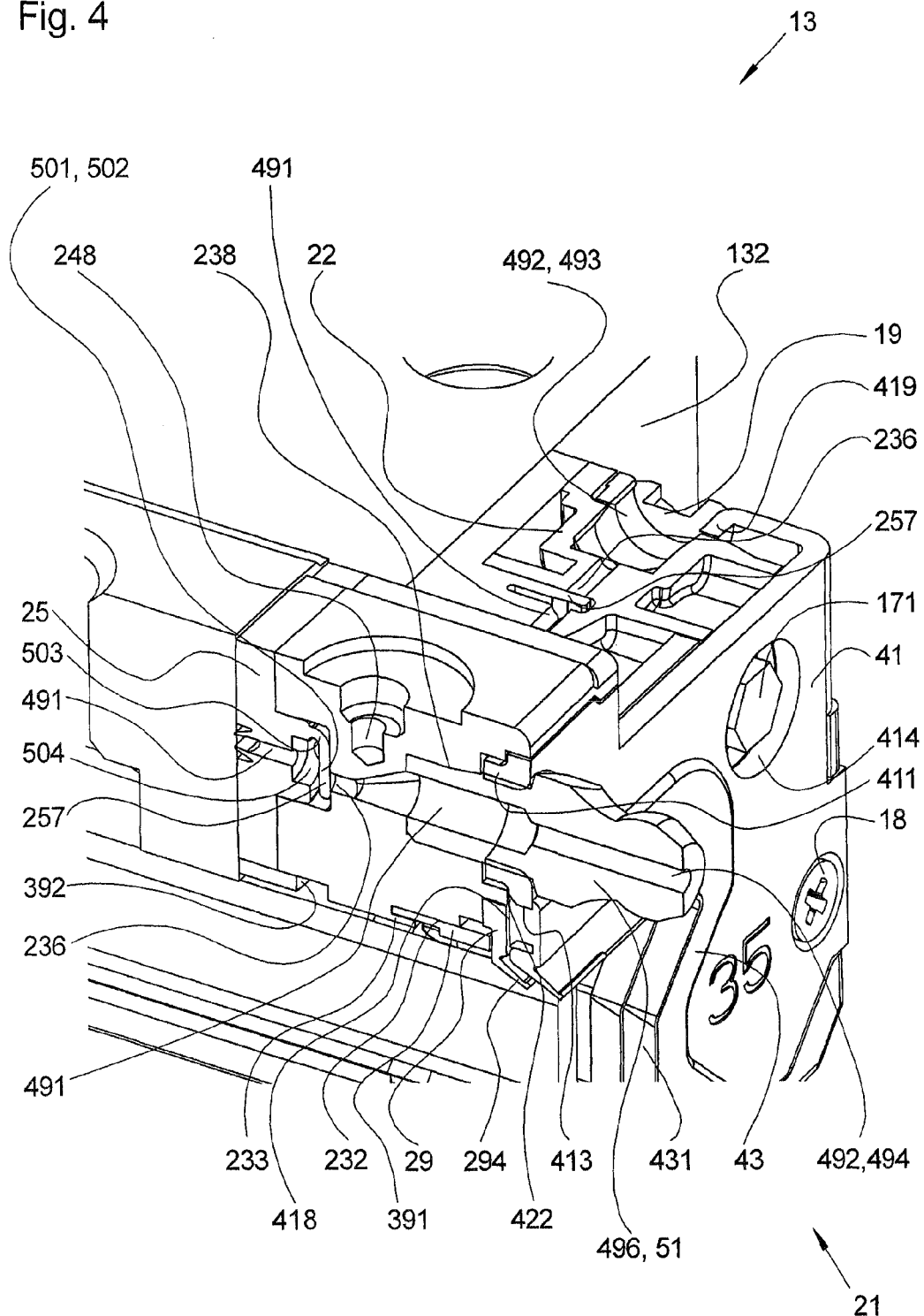
FIG. 4 shows a perspective cross-sectional view of the guide carriage in the region of the deflection assembly.

It is also shown that first guide surfaces 161 on stabilizing bar 16 are interrupted by a gap 217 and transition into a first guide surface 326 on deflection piece 32. The deflection plate engages in gap 217, thereby resulting in continuous guide contours for the spacer elements and/or rollers. In particular, the guide contours are designed without interruptions along the entire endless circulatory channel at all points of contact between end cap 22, stabilizing bar 16, the main body, return tube, and deflection plate. FIG. 3 also shows that abutting surface 216 between end cap 22 and deflection piece 32 is located in the base of guide groove 215 in deflection channel 211. FIG. 4 shows a perspective illustration of guide carriage 13 in the region of deflection assembly 21. The sectional view of the guide carriage was selected so that inlet openings 492 in lubricating channel 491 and supply valves 501 are visible.

On end-face inlet opening 494 of lubricating channel 491, a grease fitting 51 is screwed into threaded section 411 of protective plate 41, grease fitting 51 serving as a lubricant connection 496 for supplying the lubricant (grease or oil). Grease fitting 51 is pressed via threaded section 411 against end cap 22 such that it is lubricant-tight. Seal region 238 between grease fitting 51 and end cap 22 is designed as described in DE 10 2005 051598. In this context, reference is made to crimping 419 of protective plate 41, which serves to create a region of greater thickness on the protective plate. This is necessary to ensure that threaded sections 411 are sufficiently long.

A supply valve 501 in the form of a non-return valve 502 is provided in the longitudinal direction directly behind grease fitting 51. Non-return valve 501 is designed as a valve chamber 504 in end cap 22 that is provided with an orifice opening 236 in the lubricating channel. Orifice opening 236 is covered by an elastically flexible blade 257, which is designed as a single piece with deflection plate 25. To enable blade 257 to function as spring 503 of the non-return valve, it is integrally formed—such that it extends perpendicularly—with deflection plate 25, which is composed of a thermoplastic elastomer, and is bent by 90° when deflection plate 25 is inserted in end cap 22. When lubricant is now supplied under pressure via grease fitting 51, blade 257 will bend and expose orifice opening 236. As soon as lubricant pressure is no longer present, orifice opening 236 is closed once more by blade 257. Reference is hereby also made to preparation 248 for a fourth inlet opening 491 in lubricating channel. It is designed such that it may be easily opened with a sharp tool.

In the present case, lateral inlet opening 493 in the lubricating channel is closed with a threaded pin 19, since it is not used in the present exemplary embodiment. It is obvious, however, that grease fitting 51 may also be installed on lateral inlet opening 493 in the lubricating channel, end-face inlet opening 494 being closed with a threaded pin. The non-return valve on lateral inlet opening 493 is designed essentially identical to the non-return valve described above. The only aspect that was eliminated was bending valve blade 257 by 90°. Due to the non-return valves, threaded pin 19 could be eliminated and not replaced, since inlet openings 493, 494 are tightly closed even without a threaded pin.

FIG. 4 also shows a few details of the sealing of the guide carriage. It is shown, in particular, how plate-type retaining element 391 of the upper longitudinal seals bears against mating surface 232 of the end cap, which is oriented parallel to the head surface of the guide rail. Hook element 233 on mating surface 232 engages in opening 392 of plate-type retaining element 233, thereby making it possible to clamp the upper longitudinal seal—which is stretched elastically—between the two end caps.

It is also shown how sealing element 43 is integrally formed with undercut recess 413 of the protective plate. Reference is made, in particular, to the undercut of recess 413 in the longitudinal direction in the form of a chamfer 422, which ensures that sealing element 43 is retained against the protective plate in a form-fit manner in the longitudinal direction. Sealing element 43 does not extend beyond inner side 418 of protective plate 41, thereby enabling closing element 29 to be located directly next to protective plate 41. As a result, first sealing lip 294 of closing element 29 is located parallel to a third sealing lip 431 of sealing element 43. Sealing element 43 extends beyond end surface 132 of the guide carriage only in the vicinity of the guide rail.

FIG. 4 also shows that first opening 414 in protective plate 41 is designed to be larger than head 171 of the first screw bolt, so that the first screw bolt bears directly against the end cap. Since protective plate 41 is installed after the first screw bolt is screwed in place, it is not necessary for the first screw bolt to be guided entirely through the first opening. In contrast, second screw bolt 18 presses protective plate 41 against end cap 22.

Figure 5:
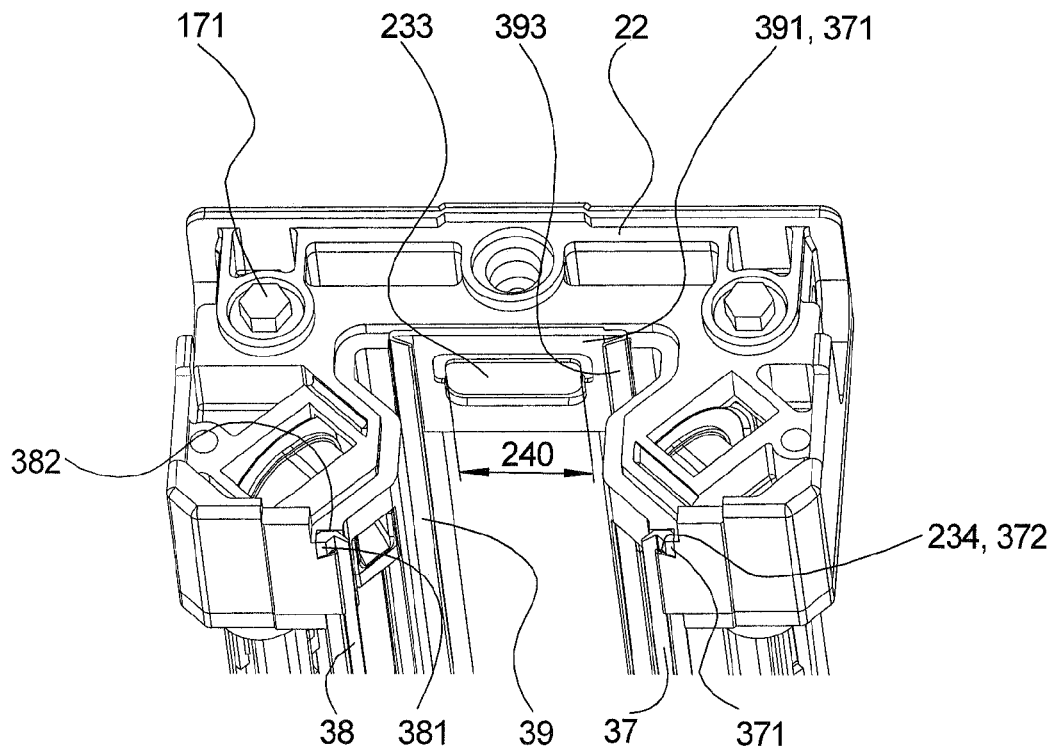
FIG. 5 shows a perspective view of the guide carriage from below, without the closing element or the stripper assembly.

FIG. 5 shows a perspective view of end cap 22, on which all four longitudinal seals 37 are installed. A thickening 381 is provided as fastening means 371 on end 382 of lower longitudinal seal 38. Thickening 381 bears against a slanted retaining surface 234, which serves as counter-fastening means 372. The two ends of the longitudinal seal are identical in design, and the cross-sectional profile (see FIG. 2) of lower longitudinal seal 38 is constant on the other side of thickening 381. Due to its tensile stress, lower longitudinal seal 38 is pressed against the base of orienting groove 239—which is located directly adjacent to retaining surface 234, see FIG. 6a—of end cap 22.

Ends 393 of the two upper longitudinal seals 39 are designed as single pieces with a common retaining element 391 as fastening means 371, which is held against end cap 22 by a hook element 233 as counter-fastening means 372. The width of hook element 240 is greater than 50% the width 114 (see FIG. 2) of head surface 113 of the guide rail. The cross-sectional profiles (see FIG. 2) of upper longitudinal seals 39 are also constant on the opposite side of common retaining element 391.

FIG. 5 also shows how head 171 of the first screw bolt bears against end cap 22.

Figure 6A:
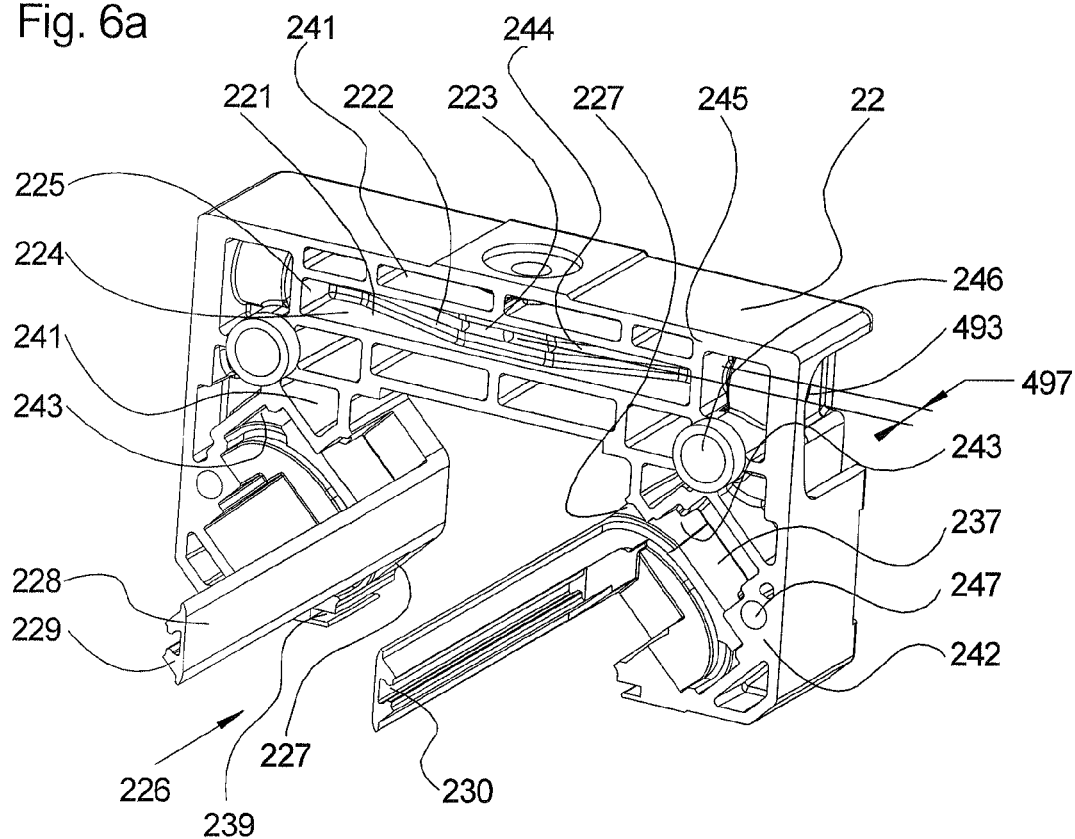
FIG. 6a shows a perspective view of the end cap.
Figure 6B:
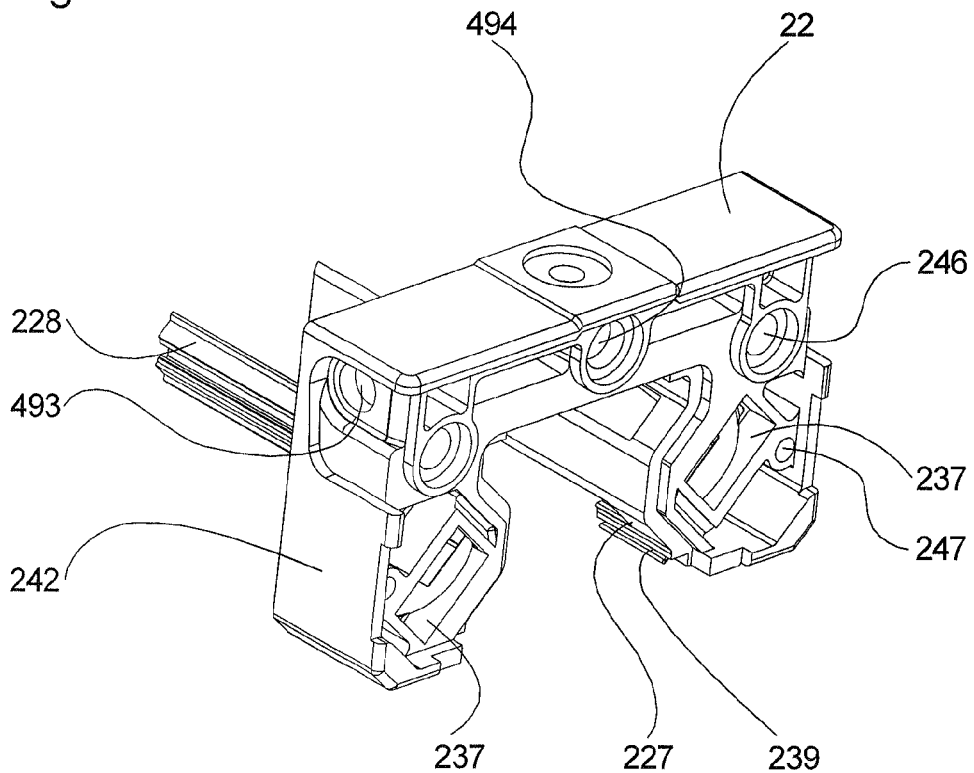
FIG. 6b shows a second perspective view of the end cap.

FIG. 6a shows end cap 22 in a perspective view from a side facing the main body. FIG. 6b shows the end cap from a side facing away from the main body. End cap 22 is designed as an injection-molded part made of the plastic polyoxymethylene (POM, trade name "Delrin"). The injection-molding tool is designed such that it is essentially composed of two mold halves, which may be closed and opened in a direction that corresponds to the longitudinal direction of the linear roller bearing. To minimize the warpage that may occur to the end cap, a large number of material recesses 241 is provided, thereby ensuring that the wall thicknesses of the end cap are essentially identical everywhere.

End cap 22 is composed of a U-shaped main body 242, which has essentially the same cross-sectional profile as that of the main body. A rolling element guide extension 228 projects perpendicularly from each leg, on inner side 226 facing the main body. Outer boundary surfaces 243 of the outer deflection channel are also provided in this region, and they are interrupted by filling channel 237 for the rollers. A lifting projection 227 is provided on each boundary surface 243, on the rail-side end, in order to lift the rolling elements off of the rail track and transfer them into the outer deflection channel, or vice versa. In FIG. 6a, left lifting projection 227 is assigned to a lower rail track, while right lifting projection 227 is assigned to an upper rail track.

FIG. 6a also shows lubricant recess 221 for receiving the insertion part, which is described below. Base 222 of lubricant recess is adapted to insertion part such that it bears against it in a lubricant-tight manner. A channel 223 is provided in the middle of the base, which, together with a matching channel in the insertion part, forms a lubricant channel with a circular cross section. The two first lateral surfaces 224 of lubricant recess 221 are designed essentially parallel to each other. A slight slant is provided to make the injection-molding tool easier to open. The same applies for second lateral surfaces 225 of the lubricant recess, which are located essentially at a right angle to first lateral surfaces 224.

The length of rolling element guide extensions 228 is matched to the length of the main body and the thickness of the deflecting plate such that end surfaces 229 of rolling element guide extensions 228 of the two end caps of the guide carriage just touch each other. The length tolerance is selected such that both end caps 22 always bear against the deflection plate with their entire surfaces. The parallelism tolerance of rolling element guide extensions 228 is designed such that they always bear against the main body with a small amount of force. The installation of the stabilizing bar in undercut groove 230 is simplified as a result.

Orienting groove 239—discussed above—for the lower longitudinal seal is provided on the end of the U-leg of main body 242. Reference is also made to the two lateral inlet openings 493 and end-face inlet openings 494 in the lubricant channel. FIG. 6a also shows offset 497 of lateral inlet opening 493 relative to flat mating surface 245 of the deflection plate, which makes it necessary to provide slanted section 244 of channel 223 in base 222 of lubricant recess 221. Finally, reference is made to circular openings 246, 247, which accommodate the first and second screw bolts.

Figure 7A:
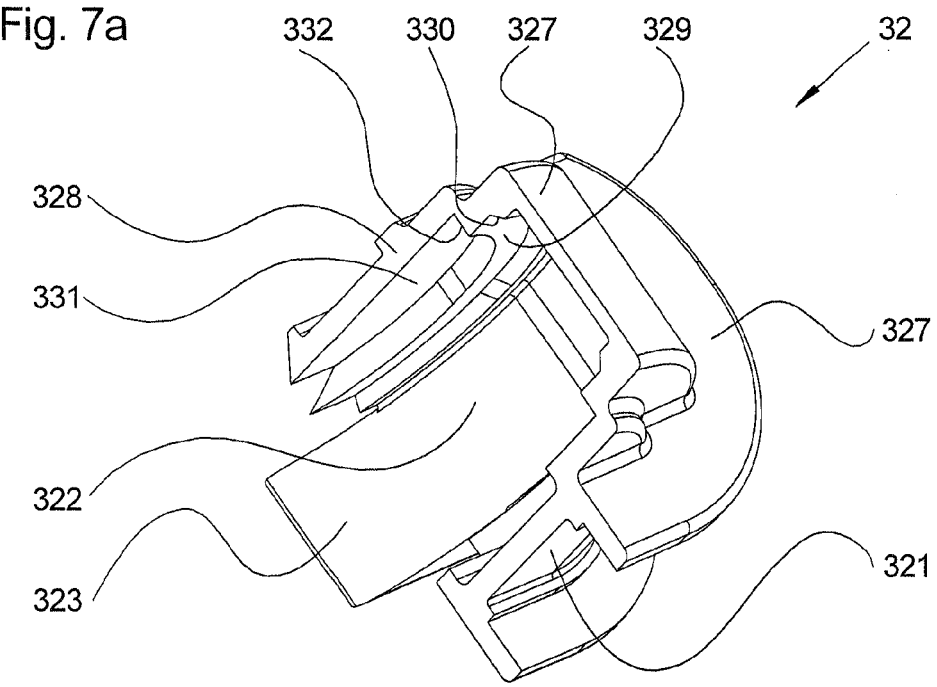
FIG. 7a shows a first perspective view of the deflection piece.
Figure 7B:
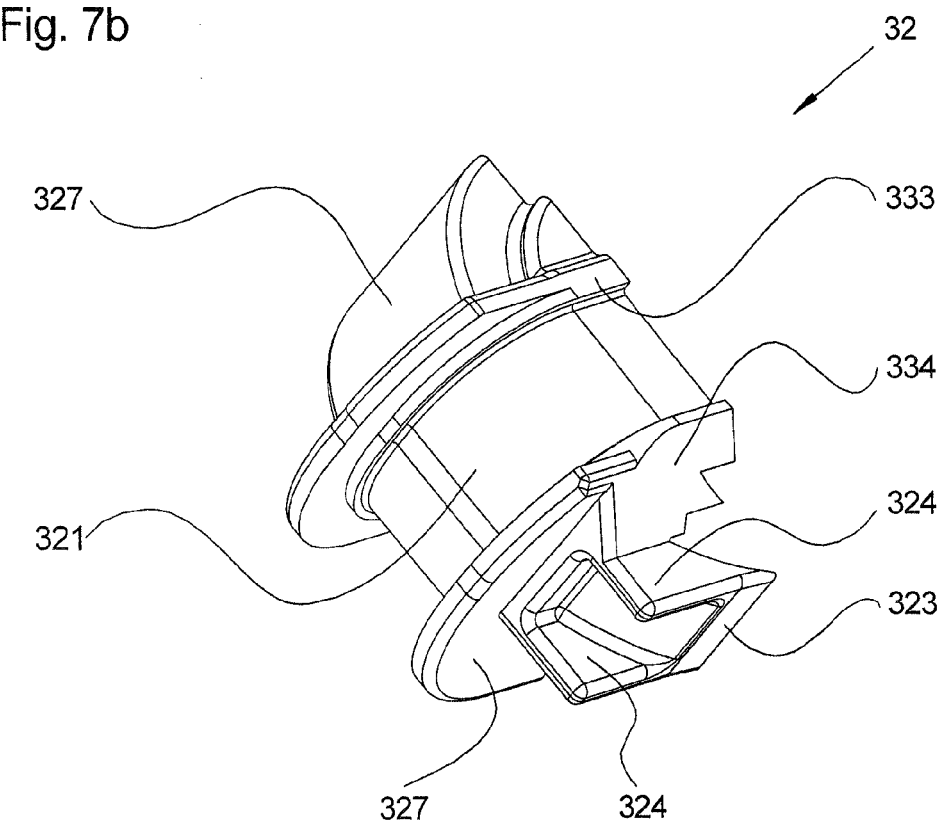
FIG. 7b shows a second perspective view of the deflection piece.

FIG. 7a shows deflection piece 32 in a perspective view from a side facing the main body. FIG. 7b shows deflection piece 32 from a side facing away from the main body. Deflection piece 32 is also designed as an injection-molded part, and is composed of the same plastic as the end cap. The deflection piece is designed such that it may essentially be manufactured using a two-part injection-molding tool without a plunger that is opened in a direction that corresponds to the longitudinal direction of the linear roller bearing. It was ensured that the wall thicknesses of the entire component are essentially constant, so that no warpage occurs during manufacture.

As shown in FIG. 7a, outer boundary surface 322 of the inner deflection channel is provided on the inner side of the deflection piece, which is completed with the deflection plate. The boundary surface described transitions as a single piece into a lifting projection 323, with which the rolling elements are lifted away from the rail track and are transferred to the inner deflection channel, or vice versa. A reinforcing rib 324 is provided on each of the two edges of lifting projection 323, in order to reinforce it.

In addition, a part of the guide groove for the lateral guide extensions of the spacer elements is provided on deflection piece 32, i.e., groove base 329 and slanted lateral surface 330. Straight lateral surface 259 (FIG. 8b) of the guide groove is provided on the deflection plate, which is described below. Straight lateral surface 259 extends in a receptacle with lateral surface 332 of material recess 331. Material recess 331 is necessary so that the wall thickness of deflection piece 32 toward inner boundary surface 321 of the outer deflection channel essentially corresponds to the rest of the wall thicknesses.

FIG. 7a also shows flat mating surface 328, with which the deflection piece bears against the rubber-elastic deflection plate. Since the end cap bears against the deflection plate under tension, deflection piece 32 is pressed elastically by the deflection plate against the end cap. Deflection piece 32 thereby bears against mating surfaces 327 of the deflection plate and is therefore oriented exactly.

FIG. 7b shows inner boundary surface 321 of the outer deflection channel, which is completed with the end cap. Reference is made to flat section 333, with which the deflection piece bears against the end cap. Flat section 333 extends in parallel with the longitudinal direction of the linear roller bearing and is necessary because, due to the guide groove for the spacer elements, no undercuts are produced, which are unable to be produced anyway using the two-part injection-molding tool described above. Deflecting piece 32 bears via slanted mating surface 334 against the rolling element guide extension of the end cap (see FIG. 3).

Figure 8A:
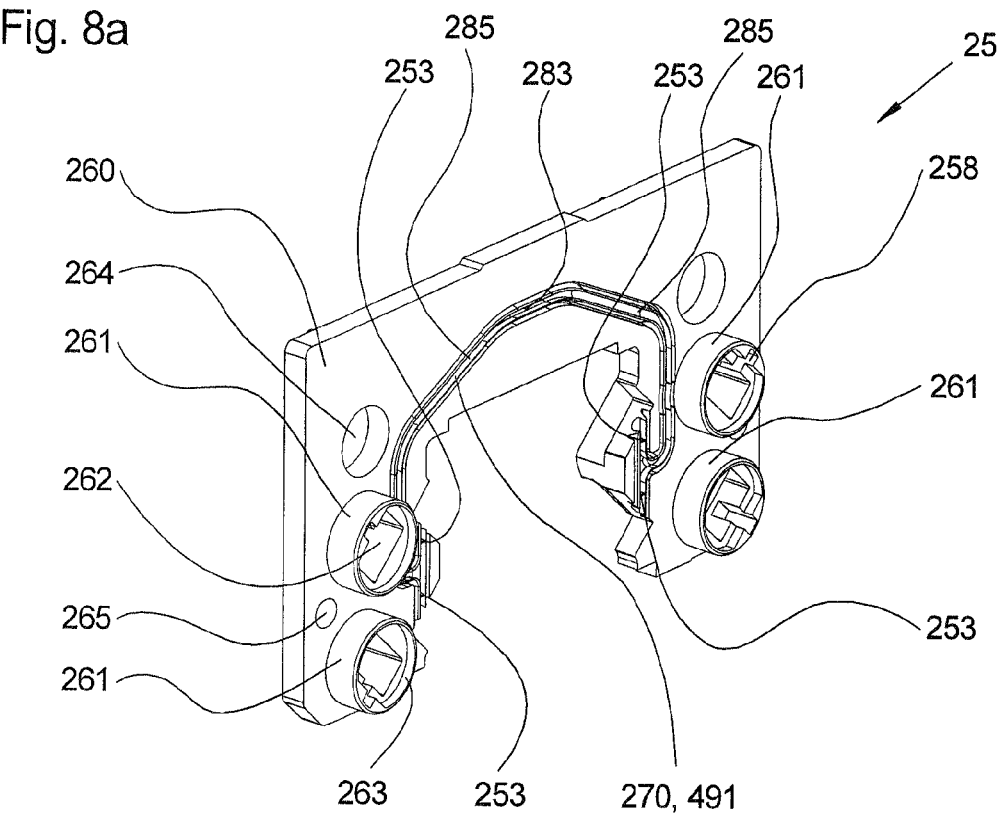
FIG. 8a shows a first perspective view of the deflection plate.
Figure 8B:
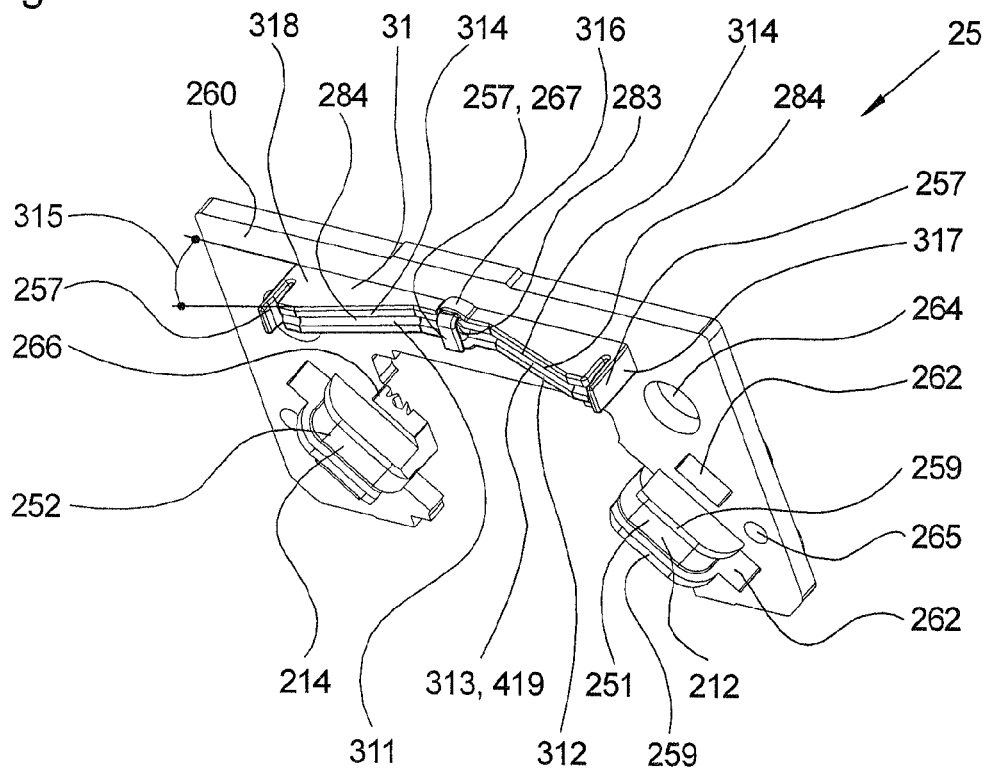
FIG. 8b shows a second perspective view of the deflection plate.

FIG. 8*a* shows a perspective view of deflection plate 25 from a side facing the main body. FIG. 8*b* shows deflection plate 25 from a side that faces away from the main body and therefore faces the end cap. Deflection plate 25 is injection-molded using a two-part tool—which is opened in the longitudinal direction of the linear roller bearing—using thermoplastic ether ester elastomer (TEEE, trade name "Hytrel"). To avoid the use of plungers in the tool described above, deflection plate 25 was designed essentially without undercuts. The rear undercut in the region of lubricant channel 270 may be manufactured without a plunger, due to the elasticity of the component.

Figure 8C:
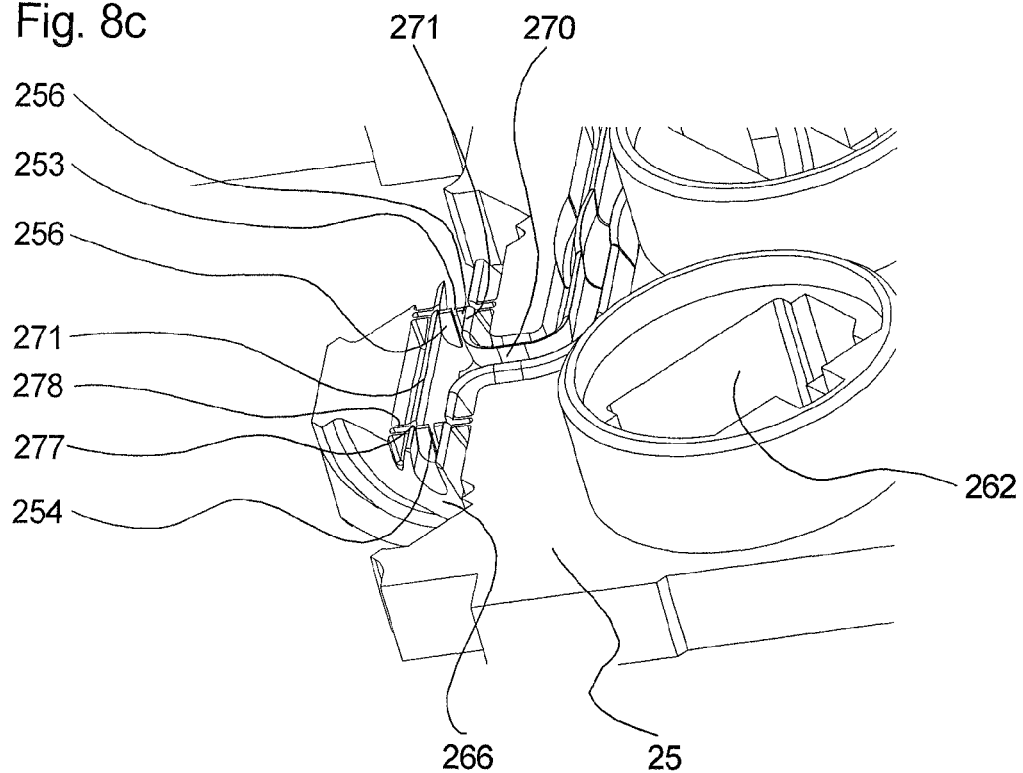
FIG. 8c shows a perspective partial view of the deflection plate in the region of the restrictor.

Deflection plate 25 is composed of a flat, plate-type main body 260, which has essentially the same cross-sectional profile as that of the main body, and an essentially constant thickness. Four circular centering projections 261 are provided as single pieces on main body 260, and they engage in return bores of the main body. A rolling element opening 262 is located inside centering projection 261, which, as shown in FIG. 8*c*, has the same cross-sectional profile as the return guide channel with guide groove in the assigned return tube, and is located flush therewith. To ensure that the position remains flush, centering recesses 263 are provided in the centering projections, in which the return tubes engage, thereby defining their position transversely to the longitudinal direction. Orienting recesses 258 are also provided in the centering recesses, in which the orienting projections of the return tube engage, thereby ensuring that the return tube may be installed in the correct rotational position. Reference is also made to circular openings 264, 265, through which the first and second screw bolts pass.

FIG. 8*a* also shows lubricant channel 270, which, together with the end surface of the main body, forms a section of lubricant channel 491. Lubricant channel 260 leads from a central opening 283 in deflection plate 25 to four boundary surfaces 266, each of which limits an endless circulatory channel. Boundary surfaces 266 are provided in extension of the carriage track on the main body, thereby ensuring a lubricant conveying connection for the rolling elements. Lubricant channel 270 therefore defines outflow channels 285, which lead away from central opening 283. A restrictor 253—which is described below—is provided in lubricant channel 270 in the vicinity of the four boundary surfaces 266.

As shown in FIG. 8*b*, two inner boundary surfaces 251, 252 of inner deflection channels 212, 214 are provided on the deflection plate, which are completed by the deflection pieces. Boundary surfaces 251, 252 described above connect two of the boundary surfaces 266 described above with related rolling element openings 262. Projections are provided on both sides of the boundary surfaces, which engage in the deflection pieces as described above and thereby form straight lateral surfaces 259 of the guide groove for the lateral guide extensions of the spacer elements.

FIG. 8*b* also shows insertion piece 31, which is designed as a single piece with deflection plate 25. It is also possible, of course, to design the insertion piece as a separate component. Insertion piece 31 engages in lubricant recess 221 (see FIG. 6*a*) of the end cap. First and second lateral surfaces 317, 318 bear against the end cap with an exact fit. A channel 313 is provided on end face 311 of insertion piece 31, which, together with a related channel in the base of lubricant recess in the end cap, forms a circular lubricant channel, which defines inflow channel 284 to opening 283. Residual end surface 312 next to channel 313 bears—in a lubricant-tight manner—on the base of the lubricant opening in the end cap. Channel 313 includes two slanted sections 314, their angle of inclination 315 relative to the end surface of the main body amounting to approximately 16°.

Blades 257 of the non-return valves, which were described above with reference to FIG. 4, are also installed on insertion part 31. It should be noted that FIG. 8*b* shows center blade 267 in the installed state, i.e., bent by 90°. When deflection plate 25 is manufactured, center blade 267 is designed straight, however, so that it extends perpendicularly away from deflection plate 25, in order to avoid undercuts, which make it necessary to use a complete injection-molding tool. Due to the soft rubber material of deflection plate 25 and the small thickness of center blade 267, they may be easily bent elastically. In the region of center blade 267, a thickening 316 is provided on insertion part 31 in order to attach center blade 267 to deflection plate 25 and to create enough space for central opening 283.

FIG. 8*c* shows a perspective partial view of deflection plate 25 in the region of restrictors 253. They each include two thin plates 256, which are separated by a passage 254. Passage 254 is designed as a narrow slit, which is sized such that the lubricant provided forms a film—due to its surface tension—between the two plates 256 when the lubricant is not pressurized. The cross-sectional area of passage 255 is therefore much smaller than the cross-sectional area of lubricant channel 270. Since plates 256 are made of the same rubber-elastic material as remaining deflection plate 25, and due to their small thickness, they may be deformed via bending. When grease is used as the lubricant, plates 256 are bent, due to the high viscosity of the grease, and they expose nearly the entire lubricant channel. To prevent plates 256 from colliding with the rolling elements, plates 256 must be located far enough away from boundary surfaces 266 of the endless circulatory channels.

Sealing projections 271, which limit lubricant channel 270 on both sides, include an interruption 277, so that plates 256 are not connected with sealing projections 271, and may move freely. To prevent lubricant from escaping lubricant channel 270 via interruption 277, a U-shaped partition 278 is provided around interruption 277.

Figure 9A:
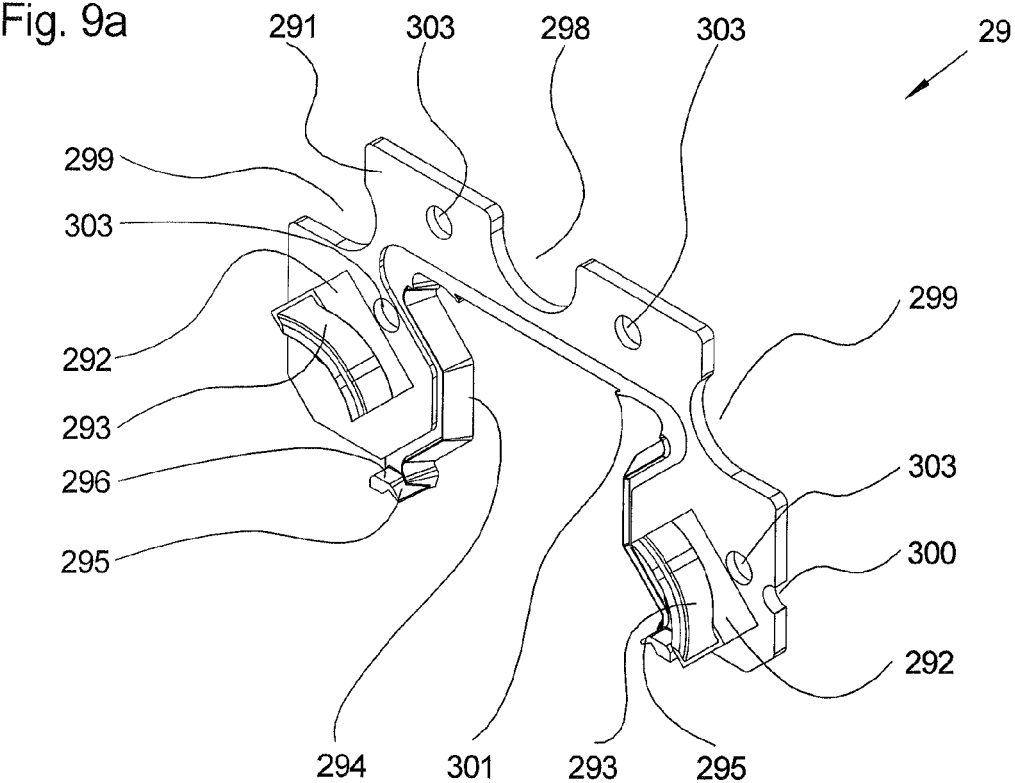
FIG. 9a shows a first perspective view of the closing element.
Figure 9B:
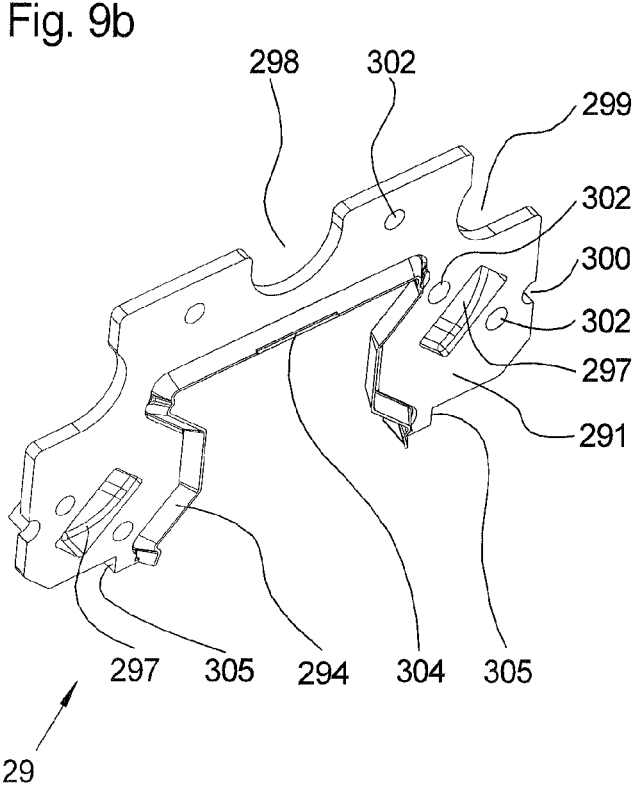
FIG. 9b shows a second perspective view of the closing element.
Figure 9C:
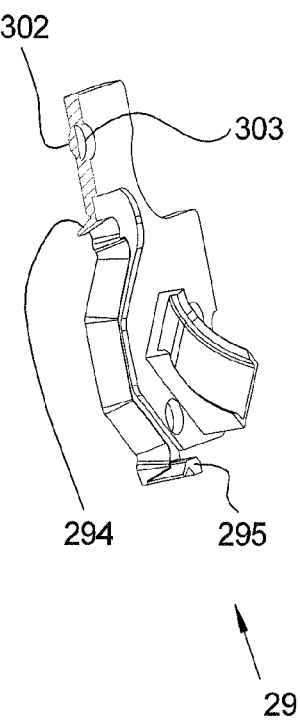
FIG. 9c shows a perspective sectional view of the closing element.

FIG. 9*a* shows a first perspective view of closing element 29 from a side that faces the end cap. FIG. 9*b* shows closing element 29 from the side facing away from the end cap. FIG. 9*c* shows a perspective side view of closing element 29. The closing element is manufactured as an injection-molded component out of thermoplastic ether ester elastomer (TEEE, trade name "Hytrel"). The related two-pieced injection-molding tool is open in a direction that corresponds to the longitudinal direction of the linear roller bearing. Rams are not required in order to form undercuts.

Closing element 29 is composed of a carrier plate 291, which is essentially U-shaped, so that first sealing lip 294 on the inner edge of carrier plate 291 bears against the guide rail in a sealing manner. The shape of the cross section of the sealing lip is shown in FIG. 9*c*. It is constant across the entire length of the first seal and follows the outer contour specified by the guide rail. Several recesses are provided on the outer side of carrier plate 291, i.e., a recess 298 in the region of the end-face inlet opening of the lubricant channel, a recess 299 in the region of the first screw bolt, and a recess 300 in the region of the second screw bolt, which create open space for the elements mentioned above.

A second sealing lip 295 is provided on both lower ends of first sealing lip 294, and is formed on a longitudinal extension 296, which projects away from carrier plate 291 at a right angle. Via transverse mating surface 305 of closing element 29, which bears against the end cap, it is ensured that the lower region of first sealing lip 294 and second sealing lips 293 bear against the guide rail with sufficient preload. Longitudinal extension 296 with second sealing lip 205 has the same cross-sectional shape as the lower longitudinal seal and extends it in a flush manner, so that the lower longitudinal seal between first sealing lips 294 of both end-face closing elements 29 is completely continuous. Similar, fourth sealing lips 301 are provided for the two upper longitudinal seals. They are only located in the region of the longitudinal extension of first sealing lip 294.

Four contact nubs 302 are provided on the side of closing element 29 facing the stripper assembly, which ensure that the closing element is pressed—at this point—particularly tightly against the end cap by the stripper assembly. To ensure that a certain amount of contact pressure is also present in the remaining region of the base plate, contact recesses 303 are provided on the side of the closing element that is opposite to contact nubs 302, which create space into which the volume of contact nubs 303 may be pressed. The dimensions of contact nubs 302 and contact recess 302 are tailored to each other such that the desired increase in contact pressure at certain points via the stripper assembly is ensured. The shape of the cross section of the contact nubs 302 with the contact recess is shown in FIG. 9c.

Reference is also made to insertion bevel 304 of the first sealing lip, which is provided to ensure that the guide carriage may be slid on the guide rail with the cover plate without damaging first sealing lip 301.

The details regarding the design of insertion bevel 304 are described in DE 10 2006 048 282.

Two closing projections 292 are provided on carrier plate 291, which are adapted to the two separate inlet openings of the end cap in an essentially gapless manner. Closing projections 292 are designed in the shape of a cup, i.e., the closing projections include a recess 297 on the side facing away from the end cap so that entire closing element 29 has essentially the same thickness everywhere, to prevent warpage from occurring during manufacturing. A wall section 293 of the outer deflection channel is provided on the end face of closing projection 292. This completes the outer wall surface of the outer deflection channel in the end cap. Essentially no gaps or steps are present at the transition points between the closing element and the end cap, thereby ensuring smooth running of the rolling elements.

Figure 10A:
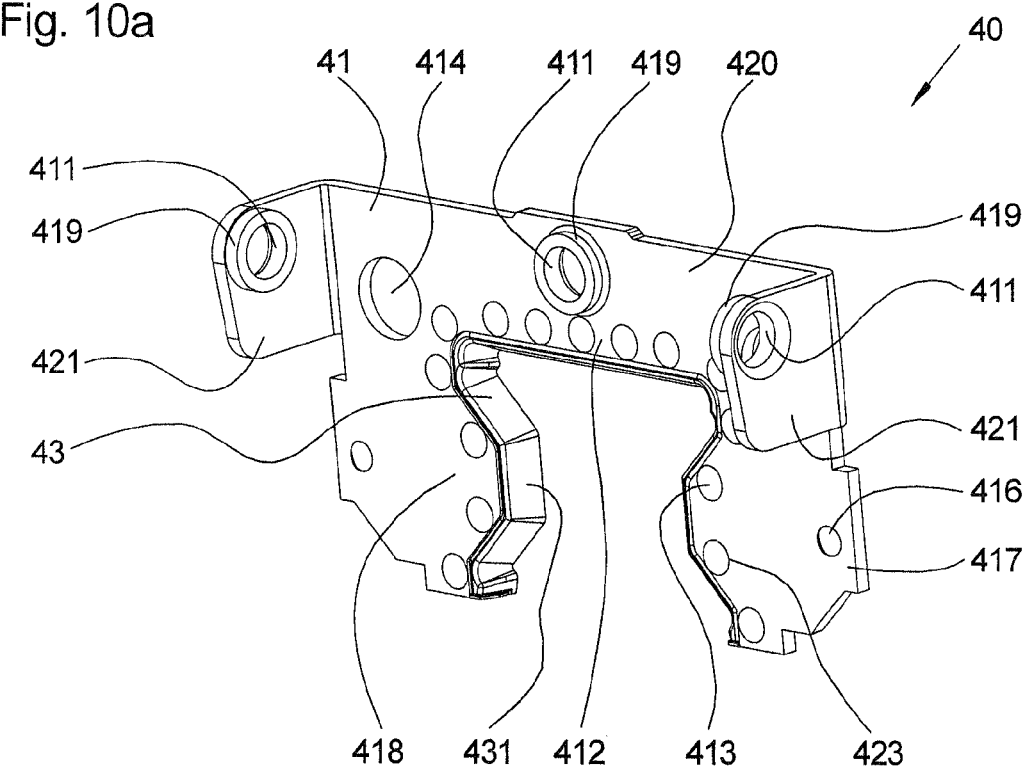
FIG. 10a shows a first perspective view of the stripper assembly.
Figure 10B:
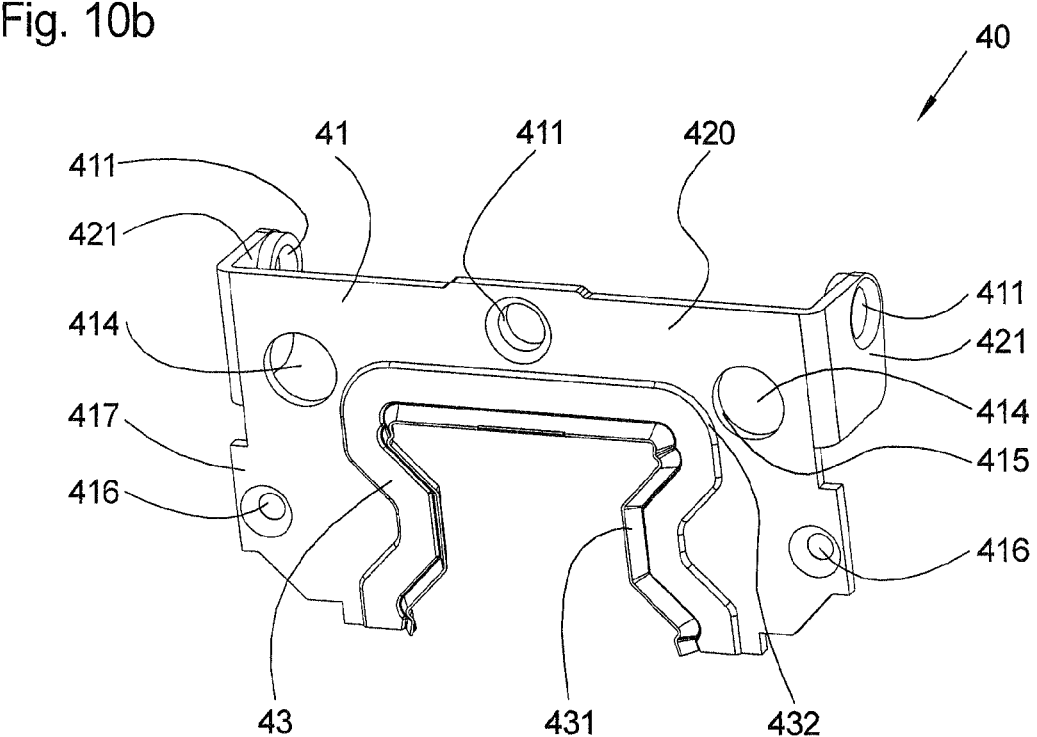
FIG. 10b shows a second perspective view of the stripper assembly.

FIG. 10a shows a first perspective view of stripper assembly 40 from a side facing the end cap. FIG. 10b shows stripper assembly 40 from a side facing away from the end cap. Stripper assembly 40 is composed of a protective plate 41, which is made of a stainless steel sheet via punching and bending. For smaller item counts, the punching process may be replaced with a laser-cutting process. Protective plate 41 was covered with a sealing element 43 applied via injection molding with thermoplastic ether ester elastomer (TEEE, trade name "Hytrel") by placing it in an injection mold that includes cavities for forming sealing element 43, which are filled with the elastomer described above.

Protective plate 41 includes an essentially U-shaped main body 420, which is provided with threaded projections 421 in the region of the lateral inlet openings, which were manufactured by bending the originally flat sheet material by 90°. Protective plate 41 is dimensioned such that it encloses the end cap with minimal play. Three threaded sections 411 are provided on protective plate 41, which are assigned to the two lateral and the one end-face opening in the lubricant channel. To create threaded sections 411, the sheet was crimped, to create regions with greater thickness 419. A thread was then cut into regions 419. Two first circular openings 414 for the first screw bolts and two second circular openings 416 for the second screw bolts are provided in the protective plate. The second bores are provided with a chamfer, to prevent the head of the second screw bolt from extending above the protective plate. Edge 415 of first opening 414 was provided immediately adjacent to edge 432 of sealing element 43. Second openings 416 are provided in a second, outer edge region 417 of protective plate 41, on which protective plate 41 is flat in design and, in particular, is not bent.

First, inner edge region 412 of U-shaped main body 420 is designed essentially equidistant to the guide rail, and a large number of undercut recesses 413 is provided. The cross-sectional shape of undercut recesses 413 was discussed above with reference to FIG. 4. It should be pointed out here that undercut recesses 413 are distributed essentially evenly across the entire length of the first edge region, and they have a circular shape. To save space, they are located such that edge 423 of the chamfer—which forms the undercut—just touches the edge of protective plate 41.

Third sealing lip 431 of sealing element 43 is designed identical with the first sealing lip of the closing element, and is located parallel therewith when the guide carriage is in the installed state. Edge 432 of sealing element 43 was placed such that undercut recesses 413 are completely covered. The latter are filled with the elastomer such that inner side 418 of the protective plate has an essentially flat surface in this region.

Figure 11A:
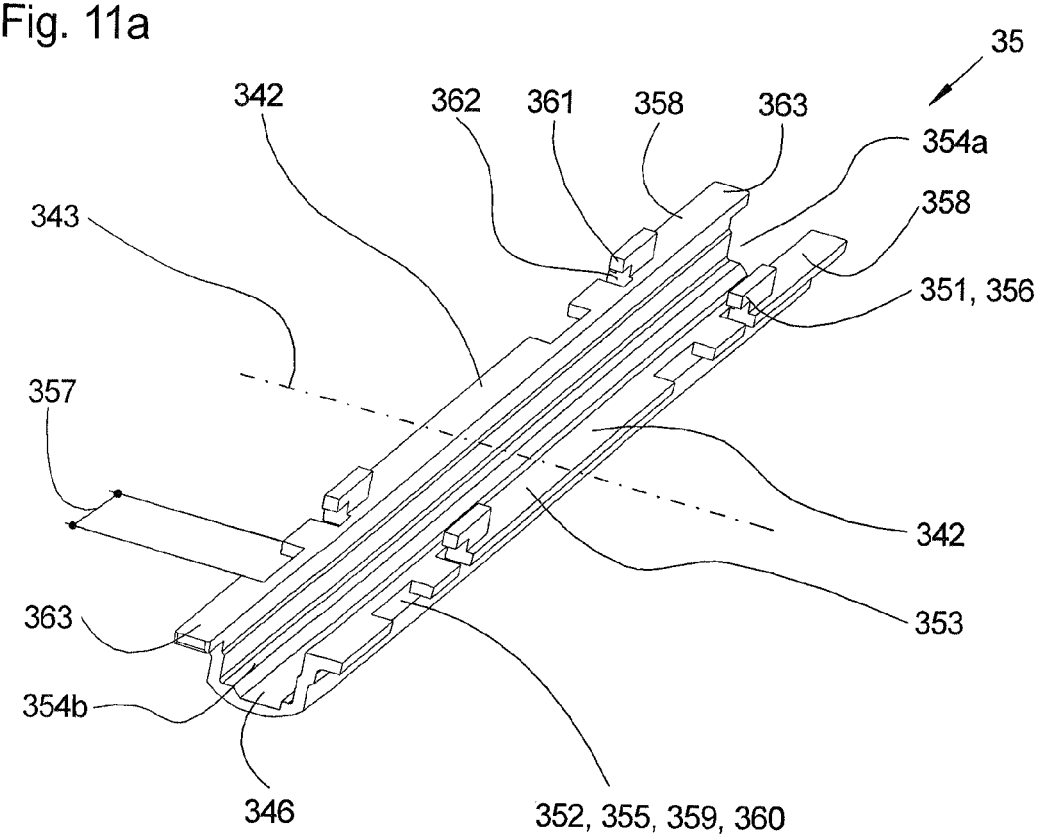
FIG. 11a shows a perspective view of a half shell of the return tube.
Figure 11B:
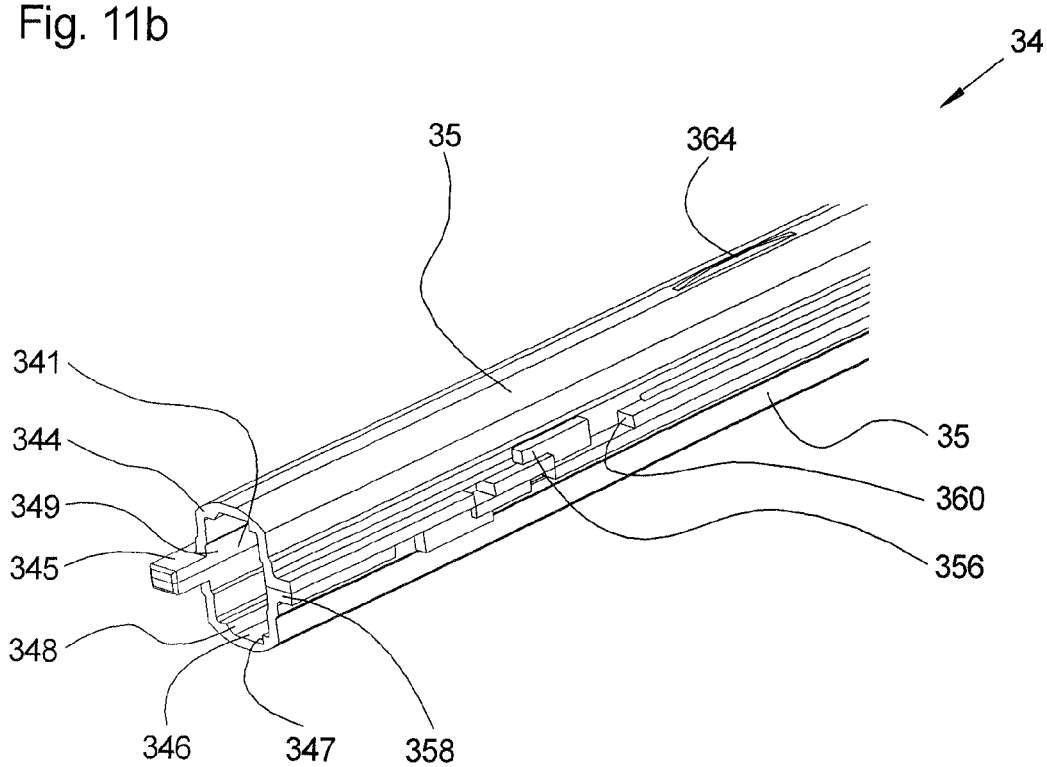
FIG. 11b shows a perspective view of the return tube.

FIG. 11a shows a perspective view of a half shell 35 of the return tube. FIG. 11b shows a perspective view of a return tube 34, which is composed of two identical half shells 35. Return tube 34 defines a return channel 341, which has the same cross-sectional shape as the remainder of the endlessly circulating channel, i.e., an essentially rectangular main shape, on the two narrow sides of which asymmetrical guide grooves 346 for the spacer elements are provided, which have a straight and a slanted lateral surface 347, 348. A clearance 349 is provided on the broad side of the rectangular main shape in the region of joining plane 342 to prevent the motion of the rollers from being disrupted by a possible misorientation of half shells 35. The cross-sectional shape described is constant across the entire length of the return tube 34. Return tube 34 includes two flat end surfaces 344, which bear against the deflection plate. One orienting projection 345 extends away from each of the flat end surfaces on one side in the longitudinal direction and engages in an orienting recess of the deflection plate, so that return tube 34 is always installed in the correct position, in particular with regard for the orientation of asymmetrical guide grooves 346.

Return tube 34 is formed by two identical half shells 35, each of which includes two flanges 358 with joining surfaces 353. Joining surfaces 353 define a common joining plane 342 and come to bear against the two half shells 35. One flange 358 is provided with extensions 363, so that extensions 363 of the two half shells 35 together form upper orienting projection 345. To ensure that the two half shells 35 may be joined, starting from a parallel orientation to the return tube, one half shell 35 must be rotated by 180° around an installation axis 343, i.e., rear—as shown in FIG. 11a—end 354a of one half shell 35 overlaps front—as shown in FIG. 11a—end 354b of the other half shell 35. Installation axis 343 is located in joining plane 342 and is oriented perpendicularly to the longitudinal direction of the linear roller bearing or perpendicularly to the longitudinal extension of the return tube. The two ends 354 of one half shell 35 are therefore designed to be symmetrical with installation axis 343.

Locking means 351 and counter-locking means 352 are provided on half shells 35. Locking and counter-locking means that are assigned to each other are located symmetrical to installation axis 343, so that they engage during installation. Locking means 351 are designed as hooks 356 that are oriented in the longitudinal direction. They engage in undercut recesses 355 as counter-locking means 352, which are designed as a first opening 359 in flanges 358, so that hook 356 may grip behind the first openings. First openings 359 are designed as lateral recesses 360 whose width 357 is selected such that hook 356 may be inserted into inlet opening—which is designed accordingly—in a direction that is perpendicular to joining plane 342. After hook 356 is inserted into lateral recesses 360, the undercut is created via a relative displacement of both half shells 35 in the longitudinal direction, thereby ensuring that half shells 35 may no longer be separated transversely to joining plane 342. Since hooks 356 and associated lateral recesses 360 are located on both sides of the return guide channel, displacement transversely to the longitudinal direction is prevented.

Half shells 35 are injection-molded using the same material as the end caps, and a two-part injection mold is used that is opened transversely to joining plane 342. In this case, the problem occurs that hooks 356 form an undercut, which is typically created with the aid of a plunger in the injection mold. To prevent this, second openings 362 are provided, which are so large that the projection surface of arm 361 of hook 356 lies perpendicularly to joining plane 342 within second opening 362. The inner surface of arm 361 of hook 356 is therefore accessible through second openings 362, which are also designed as lateral recesses.

Reference should be made to contact projection 364 on the outside of half shell 35. Via contact projection 364 it is ensured that return tube 34 bears only at a defined point against the return bore of the main body, thereby ensuring that the return tube may be installed—without the risk of tilting—in a return tube that is adapted tightly to contact projections 364 and flange 358.

Figure 12A:
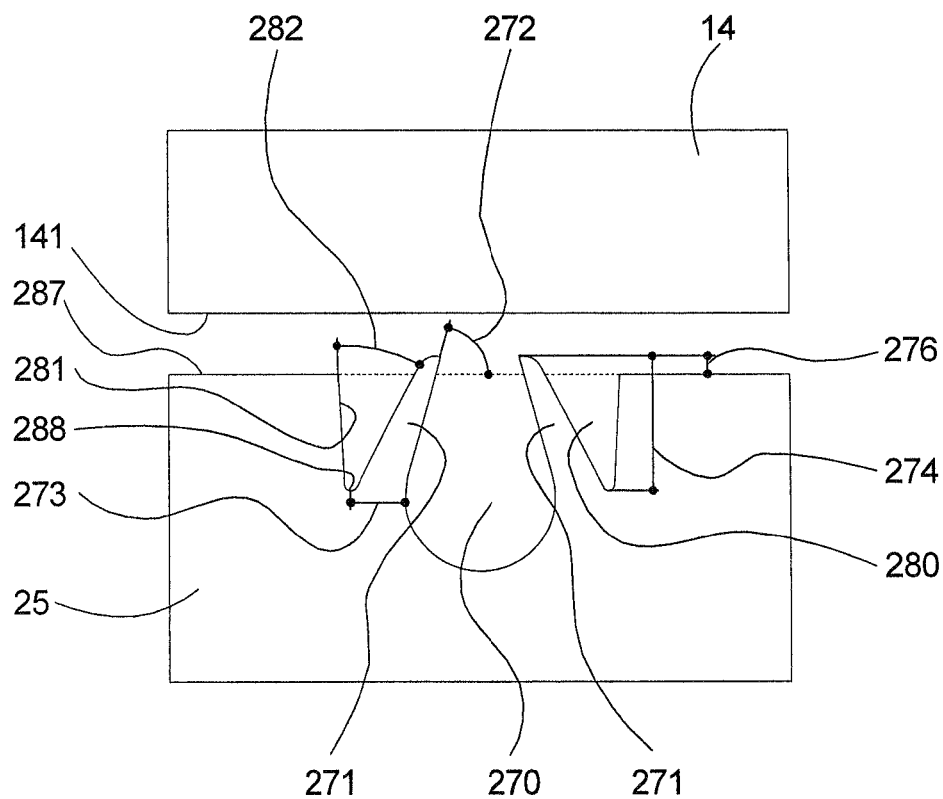
FIG. 12a shows a cross section of the lubricant channel of the deflection plate, in the uninstalled state.
Figure 12B:
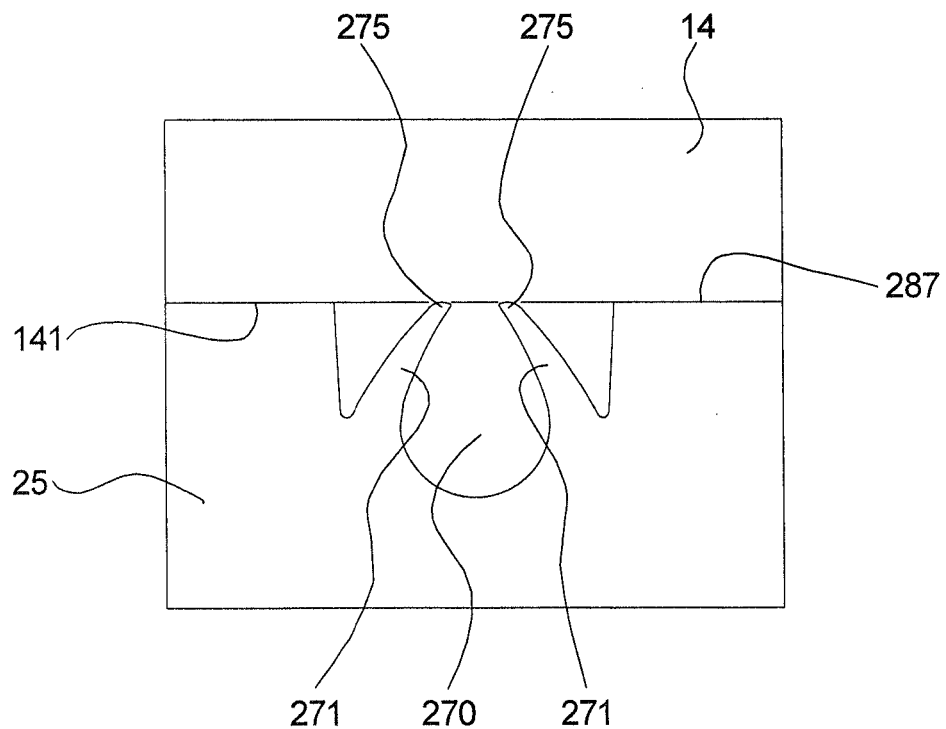
FIG. 12b shows a cross section of the lubricant channel of the deflection plate, in the installed state.

FIG. 12a shows a cross section of lubricant channel 270 of deflection plate 25 in the uninstalled state. FIG. 12b shows the cross section of lubricant channel 270 in the state in which it is installed on end surface 141 of main body 14. Deflection plate 25 and main body 14 are shown only schematically in both drawings. The cross-sectional shape of lubricant channel 270 is shown to scale.

Lubricant channel 270 is accommodated in a receiving recess 280 of deflection plate 25, the lateral walls 281 of which are oriented perpendicularly to end surface 141 of main body 14, except for a slight slant to facilitate removal from the injection-molding tool. Two sealing projections 271 are provided inside receiving recess 280 that abut lubricant channel 270 directly on the side. The cross-sectional shape of lubricant channel 270 with receiving recess 280 is symmetrical overall. Sealing projection 271 is provided on deflection plate 25 such that it already slants toward lubricant channel 270 when in the uninstalled state, so that it is bent further during installation, as shown by comparing FIG. 12a with FIG. 12b. As a result, sealing projection 271 bears with bending preload against end surface 141 of main body 14. The entire configuration is sized such that the bending stresses in sealing projection 271 remain below the flow limit of the material of sealing projection 271.

Inclination angle 272 of the sealing projection in the uninstalled, unloaded state is 75° relative to joining surface 287 between deflection plate 25 and main body 14. Overhang 276 of sealing projection 271 over joining surface 287 in the uninstalled, unloaded state is 14% of height 274 of sealing projection 271. Sealing projection 271 is designed in the shape of a wedge overall, with width 273 of base amounting to 42% of height 274 of sealing projection 271. Rounded tip 257 of the wedge-shaped sealing projection bears—in the installed state—against end surface 141 of main body 14. The outer side of sealing projection 271 meets lateral wall 281 of receiving recess at an acute angle 282. Tip 288 of the angle is rounded in order to prevent notch stresses.

Figure 13:
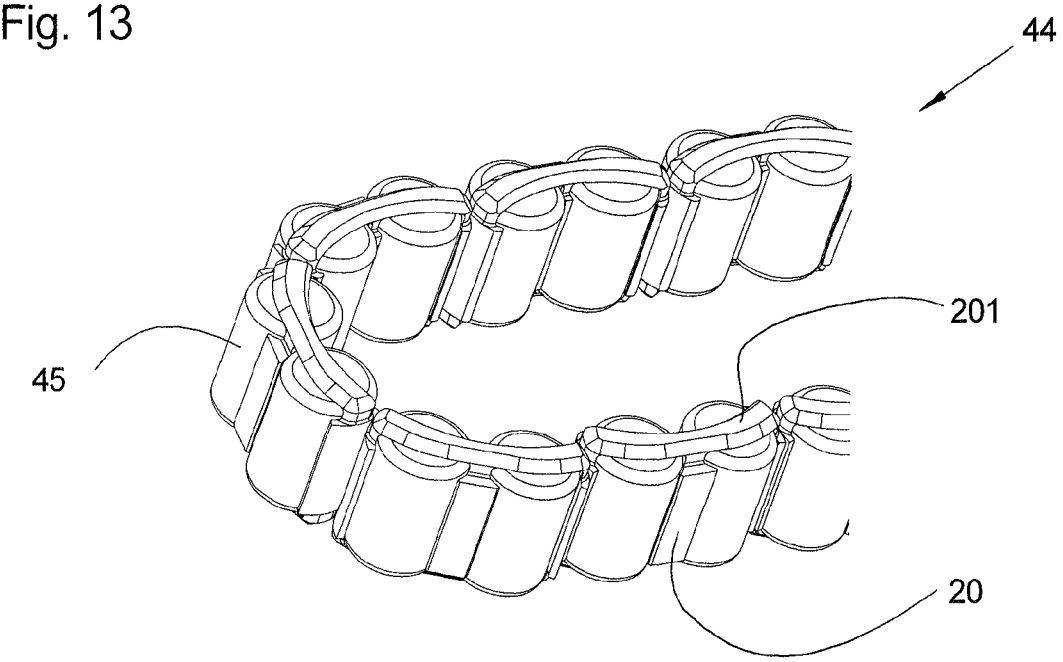
FIG. 13 shows a roller row with spacer elements.

FIG. 13 shows row 44 of rolling elements, which are designed as rollers 45. FIG. 13 also shows how they are located in the endless circulatory channels. Reference is made, in particular, to essentially rigid spacer elements 20, each of which accommodates two adjacent rollers 45 in a rotationally movable manner, thereby preventing rollers 45 from coming in contact with each other and producing noise. Spacer elements 20 are provided with lateral guide projections 201 that engage in the guide grooves provided along the entire endless circulatory channel. This ensures that the rollers are retained in the guide carriage even when the guide carriage is removed from the guide rail. Spacer elements 20 are described in detail in DE 10 2006 056 087.

In a second embodiment of the guide carriage, the spacer elements between the rollers were eliminated. As a result, the guide grooves for the lateral guide projections of the spacer elements along the endless circulatory channel were eliminated. This simplification makes it possible to design the return tubes of the first embodiment as single pieces with the deflection pieces and the deflection plates, thereby reducing cost. The stabilizing bar was also eliminated. To ensure—in the second embodiment—that the rollers are also retained in the guide carriage when it is removed from the guide rail, a sealing frame was provided that includes roller retaining projections. The upper and lower longitudinal seals are integrally formed simultaneously as single pieces with this sealing frame.

To prevent repetition, only the differences between the first and second embodiments will be discussed below. Similar parts in FIGS. 14 through 17 are therefore labeled with the same reference numerals as in FIGS. 1 through 13.

Figure 14:
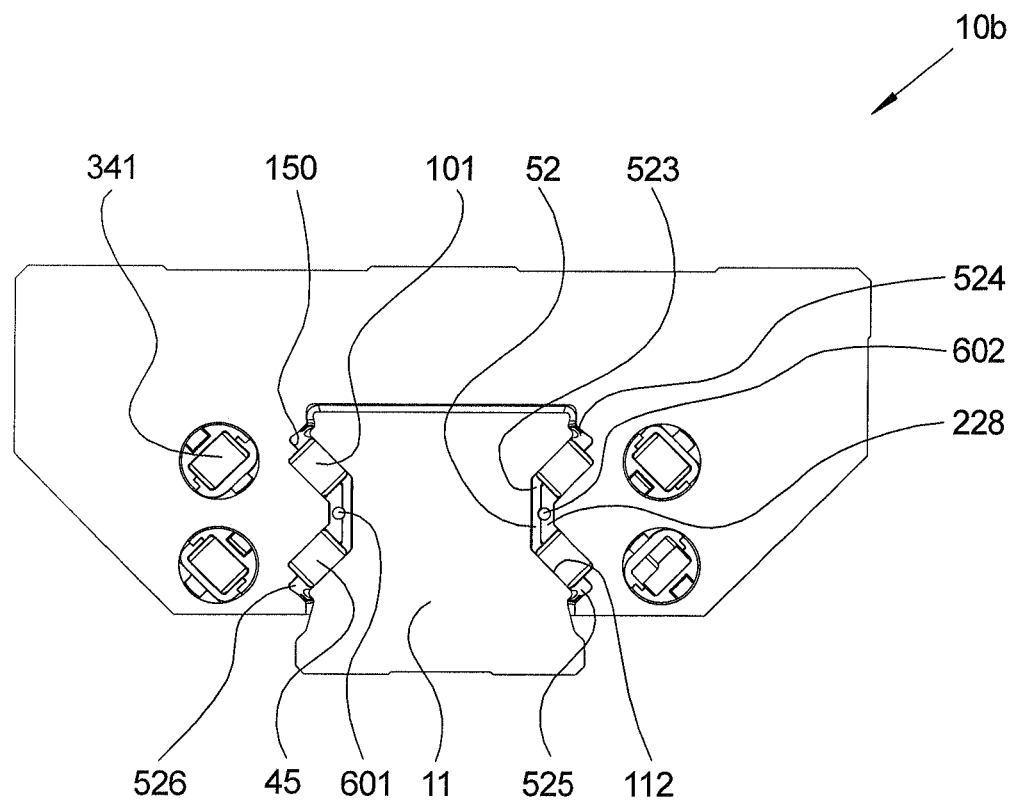
FIG. 14 shows a cross-sectional view of a linear roller bearing with the guide carriage, according to a second embodiment.
Figure 14A:
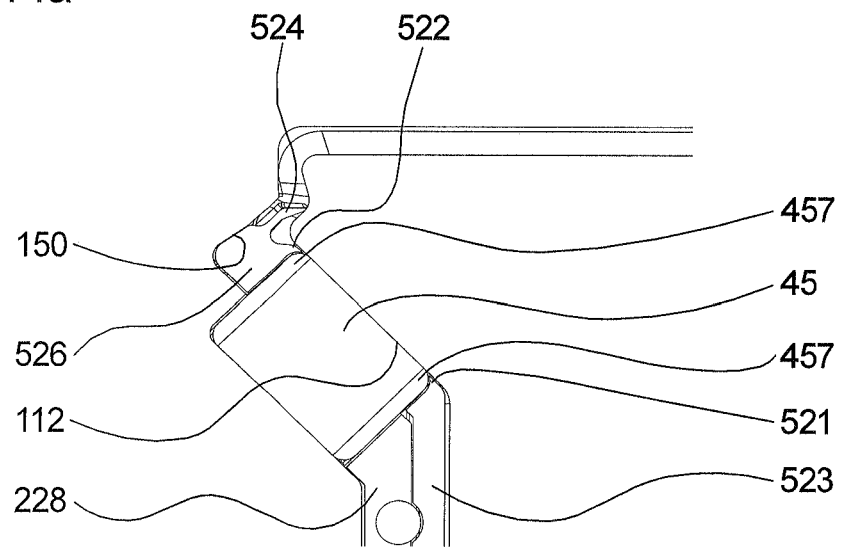
FIG. 14a shows a section of FIG. 14 in the region of a carrier channel.

FIG. 14 shows a cross section of a linear roller bearing 10b according to the second embodiment. FIG. 14a shows a section of FIG. 14 in the region of a carrier channel 101. It is shown that no spacer elements are provided between rollers 45, so no guide grooves for the spacer elements are provided in carrier channels 101 or in return guide channels 341. Instead, the lateral surfaces of the endless circulatory channel are designed flat.

Sealing frame 52 is also shown. It bears with a central part 523—that is designed essentially as a plate—against rolling element guide extensions 228 of the end cap. First rolling element retaining projections 521 are provided on the central part, which enclose cylindrical roller 45 at its edge radius 457 without touching rail track 112 on guide rail 11. The stabilizing bar is replaced with peg 601 and bores 602 on the end faces of rolling element guide extensions 228. One peg 601 and one bore 602 each are provided on an end cap, thereby making it possible to still use two identical end caps. Bore 602 is designed to match peg 601 with an exact fit to ensure that the desired orienting effect is achieved.

Figure 17:
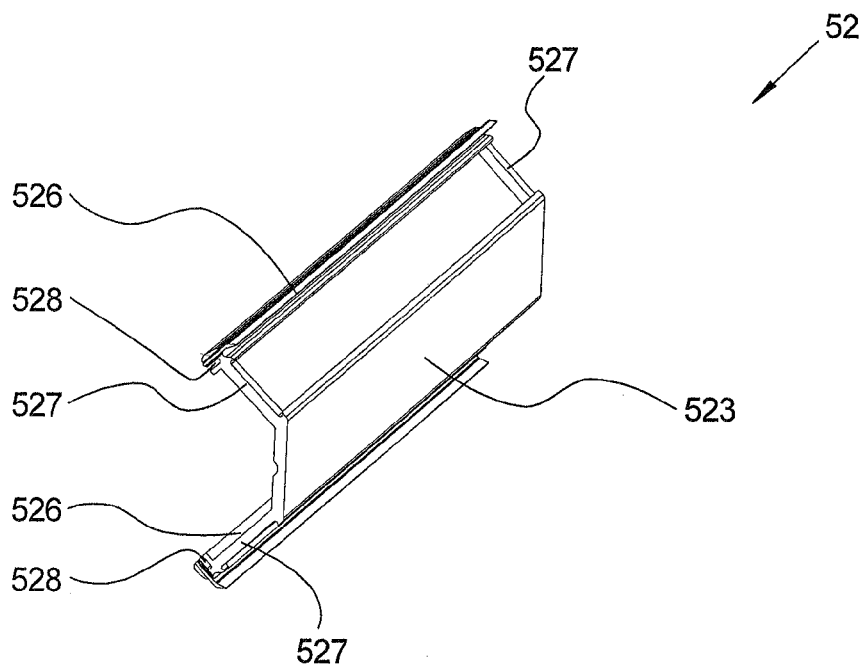
FIG. 17 shows a perspective view of the sealing frame.

Two lateral parts 526 are also provided on sealing frame 52, which are designed as single pieces with central part 523 (see FIG. 17). Second roller retaining projections 522, which are designed symmetrical with the first roller retaining projections, are formed on lateral parts 526. An upper and a lower longitudinal seal 524, 525 are provided simultaneously on lateral parts 526 of a sealing frame. Lateral parts 526 are accommodated in adapted receiving recess 150 of the main body, where they bear against guide rail 11 via the pressing force of longitudinal seals 524, 525.

Figure 15A:
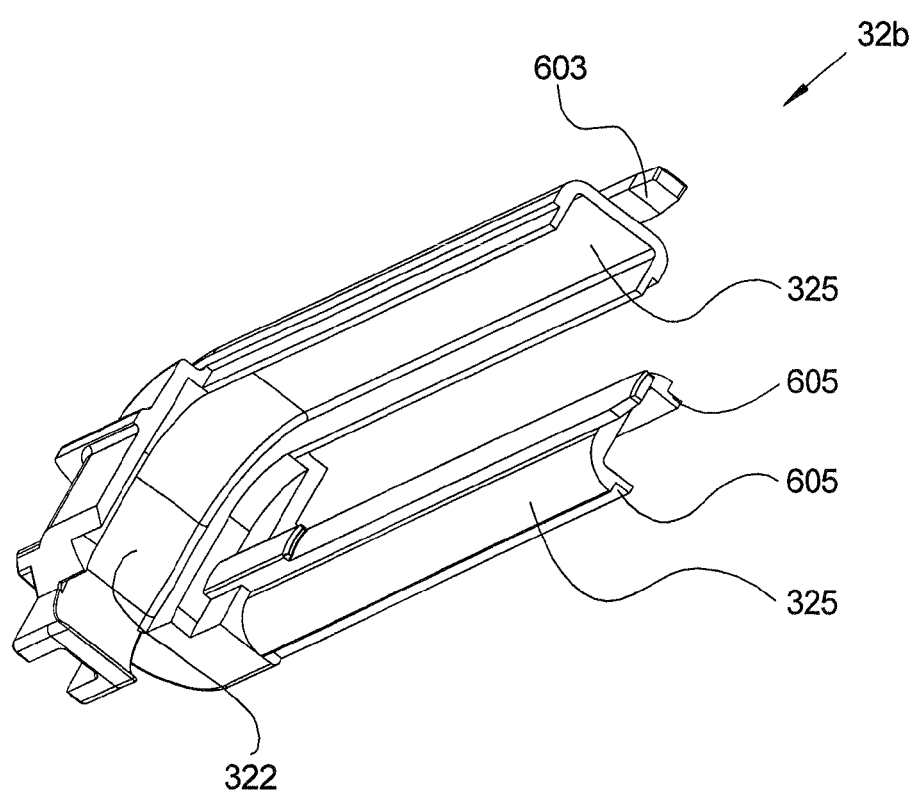
FIG. 15a shows a first perspective view of the deflection piece of the guide carriage in FIG. 14.
Figure 15B:
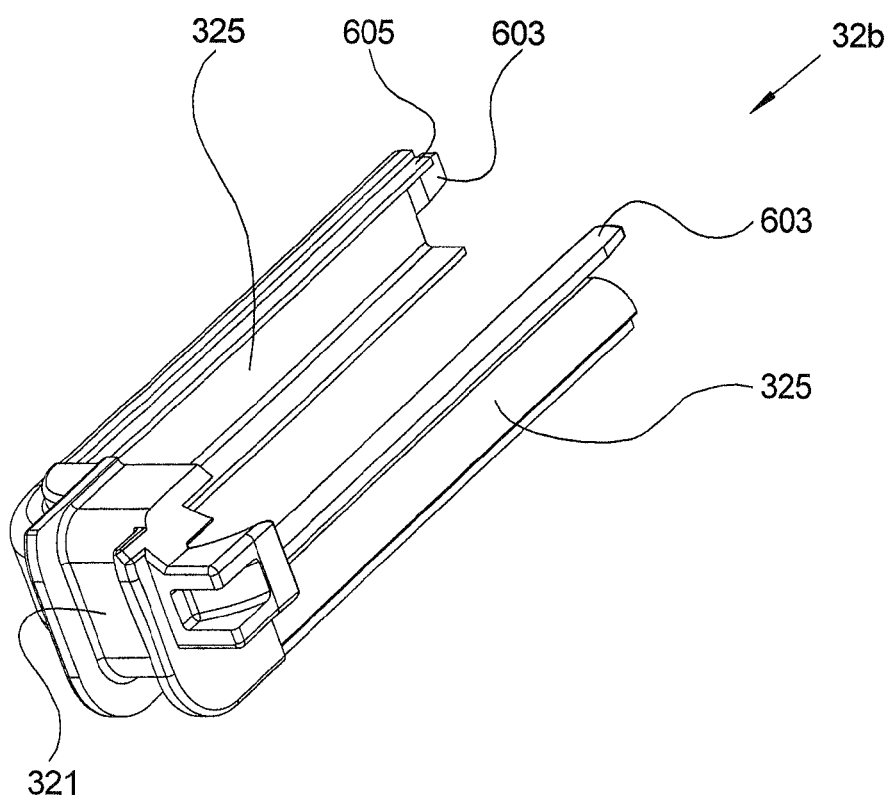
FIG. 15b shows a second perspective view of the deflection piece.

FIG. 15*a* shows a perspective view of deflection piece 32*b* of the second embodiment from a side facing the deflection plate. FIG. 15*b* shows the deflection piece from a side facing the end cap. Deflection piece 32*b* differs from deflection piece 32 in that two U-shaped extension elements 325 are provided that continue inner boundary surface 321 of the outer deflection channel and outer boundary surface 322 of the inner deflection channel in a straight line, parallel to the longitudinal axis of the linear roller bearing. The two extension elements 325 are designed with equal lengths and extend across half the length of the main body. Centering projections 603 are provided on the end face of extension elements 325, which engage in related centering recesses of the extension elements of the deflection plate. Orienting pegs 605 are provided on extension elements 325, which bear against related orienting pegs of the extension elements of the deflection plate. Via centering projections 603 and orienting pegs 605, it is ensured that the four parts that form a return guide channel bear against each other in an essentially gapless manner, thereby ensuring smooth running of the rolling elements. As mentioned above, no measures were taken with present deflection piece 32*b* to form a guide groove for spacer elements, even though this would be easily possible with the present design. To do this, it would only be necessary to also provide the contours of the first embodiment of deflection piece 32 in the region of the extension elements.

Figure 16A:
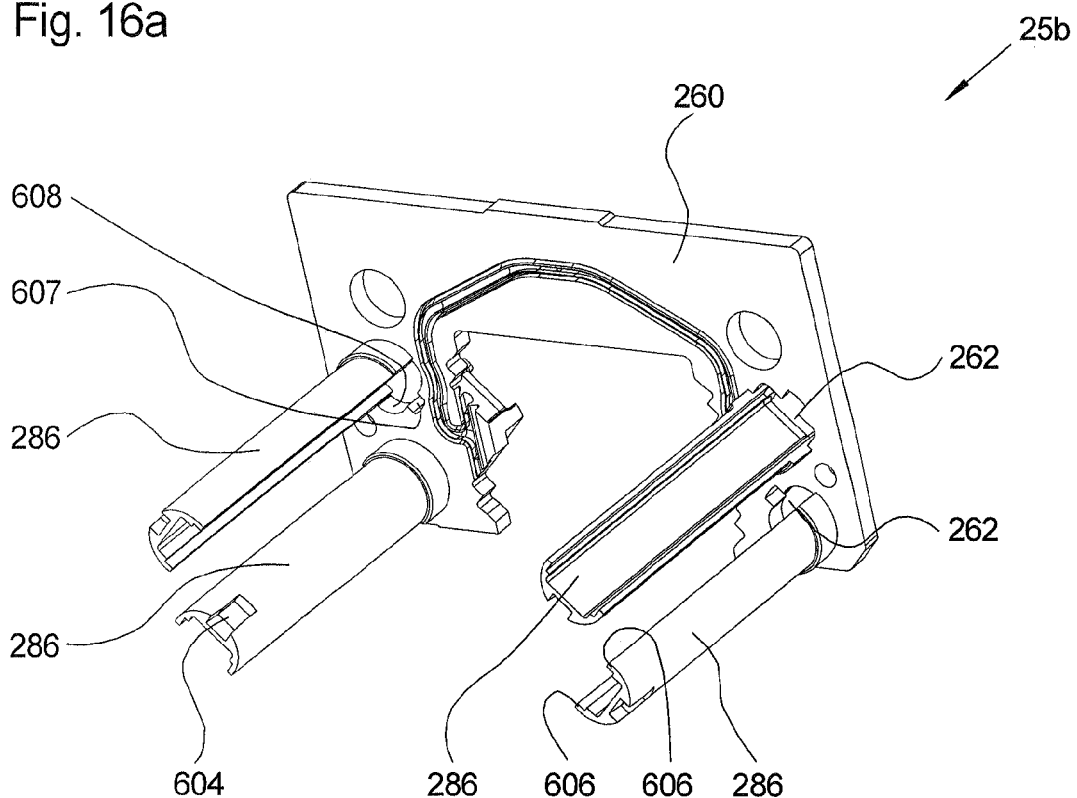
FIG. 16a shows a first perspective view of the deflection plate of the guide carriage in FIG. 14.
Figure 16B:
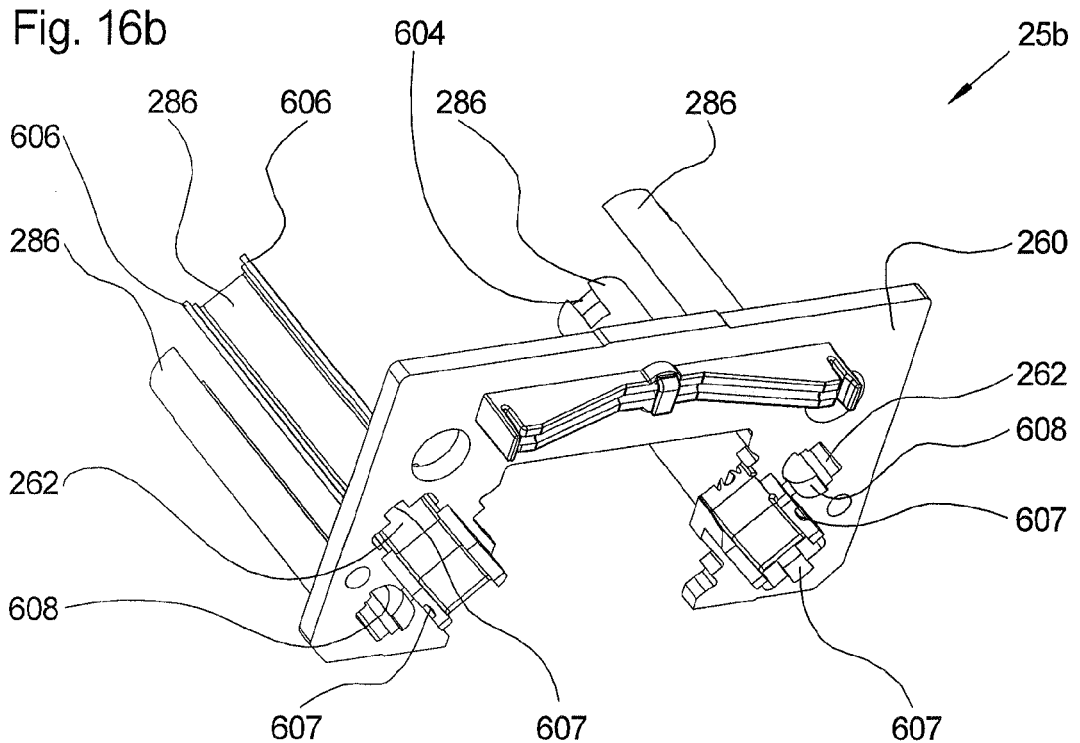
FIG. 16b shows a second perspective view of the deflection plate.

FIG. 16*a* shows a perspective view of deflection plate 25*b* from a side facing the main body. FIG. 16*b* shows deflection plate 25*b* from the side facing away from the main body. Deflection plate 25*b* differs from deflection plate 25 mainly by the fact that four U-shaped extension elements 286 are provided, which supplement the extension elements of the deflection piece to form a return tube, thereby resulting in a closed return guide channel with an essentially rectangular cross section that is adapted to the rollers. Reference is made in particular to centering recesses 604 described above and orienting pegs 606 for orienting extension elements that are assigned to each other.

A further unique feature of rolling element opening 262 is shown. It includes a section 608 that is adapted to the upper extension element so that the deflection piece may be assembled with the deflection plate. An insertion groove 607 is also provided in this region, which is adapted to the centering projection of the extension element, thereby enabling the deflection piece to be inserted more easily into rolling element opening 262. For the rest, the cross-sectional profile of main body 260 of deflection plate 25*b* was adapted to the modified cross-sectional profile of the main body, in particular in the region of the longitudinal seals.

FIG. 17 shows a perspective view of sealing frame 52. It is shown how the two lateral parts 526 are connected via retaining segments 527—located on the ends—with central part 523. Central part 523 is designed with a constant cross-sectional profile across the entire length of sealing frame 52, as shown in FIG. 14. Lateral parts 526 also have a constant cross-sectional profile across the entire length of sealing frame 52, with the exception that orienting grooves 528 are provided on the end, which engage in related orienting extensions on the end cap.

Figure 18:
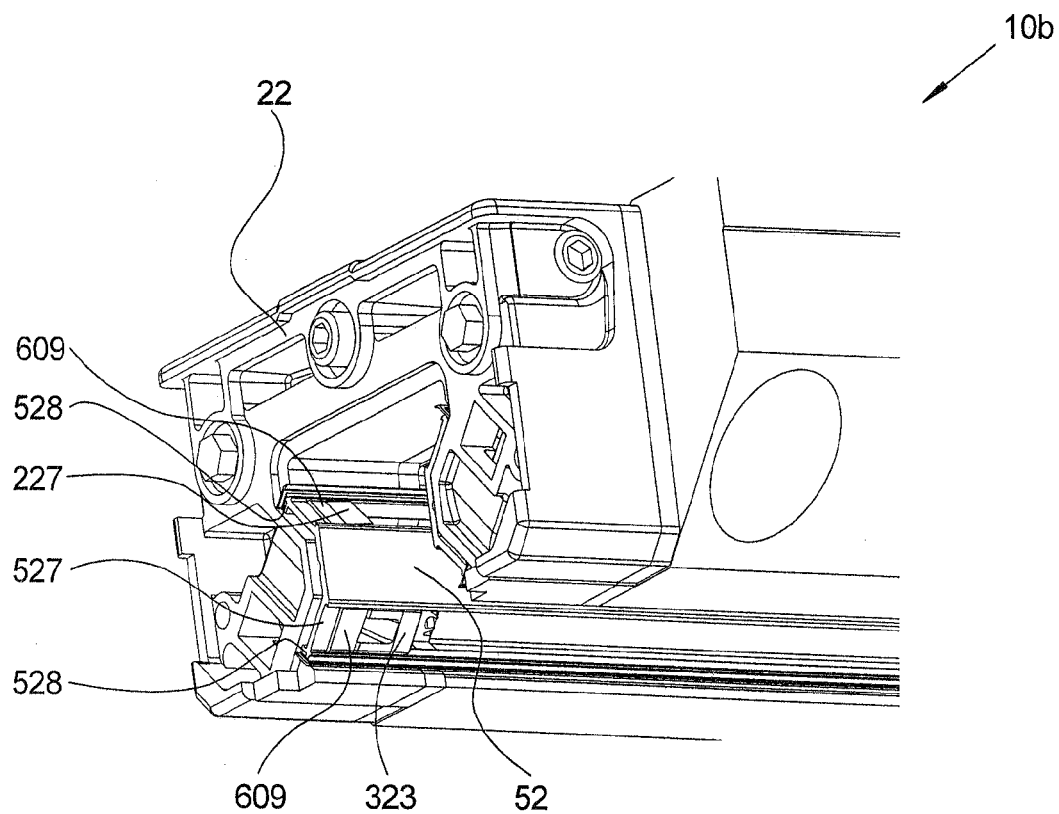
FIG. 18 shows a perspective view of the guide carriage in FIG. 14, with the stripper assembly and the closing plate removed.

FIG. 18 shows a perspective view of guide carriage 10*b* in FIG. 14, with which the stripper assembly and the closing plate were removed. It is shown how connecting segment 527 engages in adapted retaining projections 609, which are provided flush with lifting projections 227, 323. Retaining projections 609 include an undercut, thereby providing a snap-in connection between end cap 22 and sealing frame 52.

It will be understood that each of the elements described above, or two or more together, may also find a useful application in other types of constructions differing from the types described above.

While the invention has been illustrated and described as embodied in a linear roller bearing with deflection piece, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A guide carriage for a linear roller bearing, comprising:
   a main body bearable in a longitudinally movable manner and via at least a first and at least a second endlessly circulating roller row against a guide rail extending in a longitudinal direction;
   a deflection assembly provided on an end face of the main body and including at least one curved inner deflection channel for the first roller row and at least one second curved outer deflection channel for the second roller row, the inner deflection channel being located within the outer deflection channel, and the deflection assembly including an end cap, on an inner side of which that faces the main body an outer boundary surface of the outer deflection channel is provided;
   at least one separate one-pieced deflection piece being inserted in the end cap, on which an inner boundary surface is provided that covers the outer deflection channel in its entirety, wherein an outer boundary surface is provided that covers the inner deflection channel in its entirety on the deflection piece; and
   a deflection plate located between the end cap and the main body, on which an inner deflection surface of the inner deflection channel and an inner deflection surface of a third deflection channel of a third endlessly circulating roller row are provided, wherein said deflection plate is formed as one-piece.

2. A guide carriage as defined in claim 1, further comprising a lifting projection provided on the deflection piece in order to lift bearings off of the guide rail and transfer them to the associated inner deflection channel.

3. A guide carriage as defined in claim 2, further comprising at least one reinforcing rib provided on the lifting projection of the deflection piece.

4. A guide carriage as defined in claim 3, wherein the at least one reinforcing rib is oriented parallel to the longitudinal direction.

5. A guide carriage as defined in claim 1, further comprising at least one lifting projection provided on the deflection piece in order to lift rollers off of the guide rail and transfer them to the outer deflection channel.

6. A guide carriage as defined in claim 1, wherein two of each of the first and second endlessly circulating roller rows are provided, and two of the identical deflection pieces are located in the end cap in antiparallel positions.

7. A guide carriage as defined in claim 1, wherein at least one guide groove for spacers located between rollers is provided in the deflection channels, and a vertical joint between the deflection piece and the end cap or a deflection plate and the deflection piece being located within the guide groove.

8. A guide carriage for a linear roller bearing, comprising:
a main body bearable in a longitudinally movable manner and via at least a first and at least a second endlessly circulating roller row against a guide rail extending in a longitudinal direction;
a deflection assembly provided on an end face of the main body and including at least one curved inner deflection channel for the first roller row and at least one second curved outer deflection channel for the second roller row, the inner deflection channel being located within the outer deflection channel, and the deflection assembly including an end cap, on an inner side of which that faces the main body an outer boundary surface of the outer deflection channel is provided; and
at least one separate one-pieced deflection piece being inserted in the end cap, on which an inner boundary surface is provided that covers the outer deflection channel in its entirety, wherein an outer boundary surface is provided that covers the inner deflection channel in its entirety on the deflection piece,
wherein at least one guide groove for spacers located between rollers is provided in the deflection channels, and a vertical joint between the deflection piece and the end cap or a deflection plate and the deflection piece being located within the guide groove, and
wherein the vertical joint is located in a base of the guide groove.

9. A guide carriage as defined in claim 8, further comprising at least one extension element having a U-shaped cross section and provided on an element selected from the group consisting of the end cap and a deflection plate, and forming an extension element of the deflection piece into a return tube.

10. A guide carriage as defined in claim 9, wherein said extension element is configured as a single piece with the deflection plate, which is composed of a softer material than that of the extension element.

11. A guide carriage as defined in claim 8, further comprising essentially identical deflection assemblies provided on two end faces of the main body, and extension elements of the deflection pieces of the two deflection assemblies combining to form return tubes.

12. A guide carriage for a linear roller bearing, comprising:
a main body bearable in a longitudinally movable manner and via at least a first and at least a second endlessly circulating roller row against a guide rail extending in a longitudinal direction;
a deflection assembly provided on an end face of the main body and including at least one curved inner deflection channel for the first roller row and at least one second curved outer deflection channel for the second roller row, the inner deflection channel being located within the outer deflection channel, and the deflection assembly including an end cap, on an inner side of which that faces the main body an outer boundary surface of the outer deflection channel is provided;
at least one separate one-pieced deflection piece being inserted in the end cap, on which an inner boundary surface is provided that covers the outer deflection channel in its entirety, wherein an outer boundary surface is provided that covers the inner deflection channel in its entirety on the deflection piece; and
at least one extension element with a U-shaped cross section provided on the deflection piece and extending an element selected from the group consisting of an outer boundary surface for the inner deflection channel, an inner boundary surface for the outer deflection channel, and both in the longitudinal direction.

13. A guide carriage as defined in claim 12, wherein two substantially identical deflection assemblies are provided on two end faces of the main body, and return tubes meeting inside the main body such that the rollers are transferable from one of said the return tubes into an adjacent one of the return tubes.

14. A linear roller bearing, comprising:
a guide rail extending in a longitudinal direction, against which a guide carriage bears in a longitudinally moveable manner, wherein said guide carriage comprises:
a main body bearable in a longitudinally movable manner and via at least a first and at least a second endlessly circulating roller row against a guide rail extending in a longitudinal direction;
a deflection assembly provided on an end face of the main body and including at least one curved inner deflection channel for the first roller row and at least one second curved outer deflection channel for the second roller row, the inner deflection channel being located within the outer deflection channel, and the deflection assembly including an end cap, on an inner side of which that faces the main body an outer boundary surface of the outer deflection channel is provided;
at least one separate one-pieced deflection piece being inserted in the end cap, on which an inner boundary surface is provided that covers the outer deflection channel in its entirety, wherein an outer boundary surface is provided that covers the inner deflection channel in its entirety on the deflection piece,
wherein at least one guide groove for spacers located between rollers is provided in the deflection channels, and a vertical joint between the deflection piece and the end cap or a deflection plate and the deflection piece being located within the guide groove, and
wherein the vertical joint is located in a base of the guide groove.

* * * * *